United States Patent
Nio et al.

(10) Patent No.: US 11,124,664 B2
(45) Date of Patent: Sep. 21, 2021

(54) INK AND INK SET

(71) Applicant: DIC Corporation, Tokyo (JP)

(72) Inventors: Takahiro Nio, Kita-adachi-gun (JP); Maiko Kitade, Kita-adachi-gun (JP); Yuri Shouji, Kita-adachi-gun (JP); Masaki Hosaka, Kita-adachi-gun (JP); Saki Fukui, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/498,183

(22) PCT Filed: Mar. 29, 2018

(86) PCT No.: PCT/JP2018/013161
§ 371 (c)(1),
(2) Date: Sep. 26, 2019

(87) PCT Pub. No.: WO2018/190139
PCT Pub. Date: Oct. 18, 2018

(65) Prior Publication Data
US 2020/0048486 A1 Feb. 13, 2020

(30) Foreign Application Priority Data
Apr. 10, 2017 (JP) .............................. JP2017-077482

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41M 5/0047* (2013.01); *C09D 11/38* (2013.01); *C09D 11/40* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 10,336,100 B2 7/2019 Makuta
2004/0130676 A1 7/2004 Doshi et al.
(Continued)

FOREIGN PATENT DOCUMENTS

JP 2001-2964 A 1/2001
JP 2006-321065 A 11/2006
(Continued)

OTHER PUBLICATIONS

International Search Report dated Jul. 3, 2018, issued in counterpart International Application No. PCT/JP2018/013161 (2 page).
(Continued)

*Primary Examiner* — Manish S Shah
(74) *Attorney, Agent, or Firm* — Westerman, Hattori, Daniels & Adrian, LLP

(57) ABSTRACT

The problem to be solved by the present invention is to provide an ink that can be used f producing a print having no streaks even in a case where the distance between the surface of a recording medium such as a cardboard and an ink jet head is long. The present invention relates to an ink for use in an ink jet recording method in which the distance from a surface (x) having an ink discharge port of an ink jet head to a position (y) where a line perpendicular to the surface (x) intersects with a recording medium is 2 mm or more, the ink having a viscosity in the range of 2 mPa·s or more and less than 9 mPa·s and a surface tension in the range of 20 mN/m to 40 mN/m.

9 Claims, 1 Drawing Sheet

(51) Int. Cl.
*B41M 5/00* (2006.01)
*C09D 11/38* (2014.01)
*C09D 11/40* (2014.01)

(58) Field of Classification Search
CPC ...... B41J 2/1755; B41J 2/2114; B41J 2/2117;
B41J 2/2056; B41J 2/21; B41J 2/0057;
B41J 3/60; B41J 2002/012; B41J
2/04598; B41J 2/1623; B41J 2202/00;
B41J 2202/03; B41J 2/14201; B41J
2/045; B41J 11/0015; B41J 11/002; B41J
2/04581; B41J 2/055; B41J 2/16538;
B41J 2002/16502; B41J 29/02; B41J
2/17513; B41J 2/17509; B41J 29/13;
B41J 2/17553; B41J 2/1606; B41J
2/1642; B41J 2/1609; B41J 2/164; B41J
2/162; B41J 2/161; B41J 2/19; B41J
15/04; B41J 2/04588; B41J 2/04595;
B41J 2/04586; B41J 2/14274; C09D
11/36; C09D 11/40; C09D 11/30; C09D
11/38; C09D 11/32; C09D 11/322; C09D
11/324; C09D 11/328; C09D 11/101;
C09D 11/102; C09D 11/005; C09D
11/54; C09D 11/52; C09D 11/106; B41M
5/0011; B41M 5/0017; B41M 5/0023;
B41M 5/0047; B41M 7/00; B41M
7/0072; B41M 5/52; B41M 5/5218;
B41M 5/5227

See application file for complete search history.

(56) References Cited

U.S. PATENT DOCUMENTS

| | | | |
|---|---|---|---|
| 2007/0173053 A1* | 7/2007 | Fukuchi | H05K 3/4647 438/622 |
| 2008/0033072 A1* | 2/2008 | Nagase | C07D 493/08 522/169 |
| 2009/0075206 A1* | 3/2009 | Kanchiku | C09D 4/00 430/286.1 |
| 2010/0194836 A1* | 8/2010 | Prolss | C09D 11/322 347/100 |
| 2011/0048278 A1* | 3/2011 | Kiyomoto | C09D 11/322 106/31.86 |
| 2013/0189499 A1* | 7/2013 | Blanton | C09D 11/38 428/195.1 |
| 2014/0368591 A1 | 12/2014 | Umebayashi | |
| 2015/0002575 A1* | 1/2015 | Blanton | C09D 11/38 347/20 |
| 2015/0247044 A1 | 9/2015 | Brandstein et al. | |
| 2016/0090497 A1* | 3/2016 | Ito | B41J 2/2107 347/100 |
| 2017/0342288 A1 | 11/2017 | Kitade et al. | |

FOREIGN PATENT DOCUMENTS

| | | |
|---|---|---|
| JP | 2011-12226 A | 1/2011 |
| JP | 2011-46946 A | 3/2011 |
| JP | 2011-76105 A | 4/2011 |
| JP | 2013-213196 A | 10/2013 |
| JP | 2015-533873 A | 11/2015 |
| WO | 2016/098603 A1 | 6/2016 |
| WO | 2016/194729 A1 | 12/2016 |

OTHER PUBLICATIONS

Notice of Reasons for Refusal dated Nov. 29, 2018, issued in counterpart Japanese Patent Application No. 2018-556505, w/English translation (8 pages).

* cited by examiner

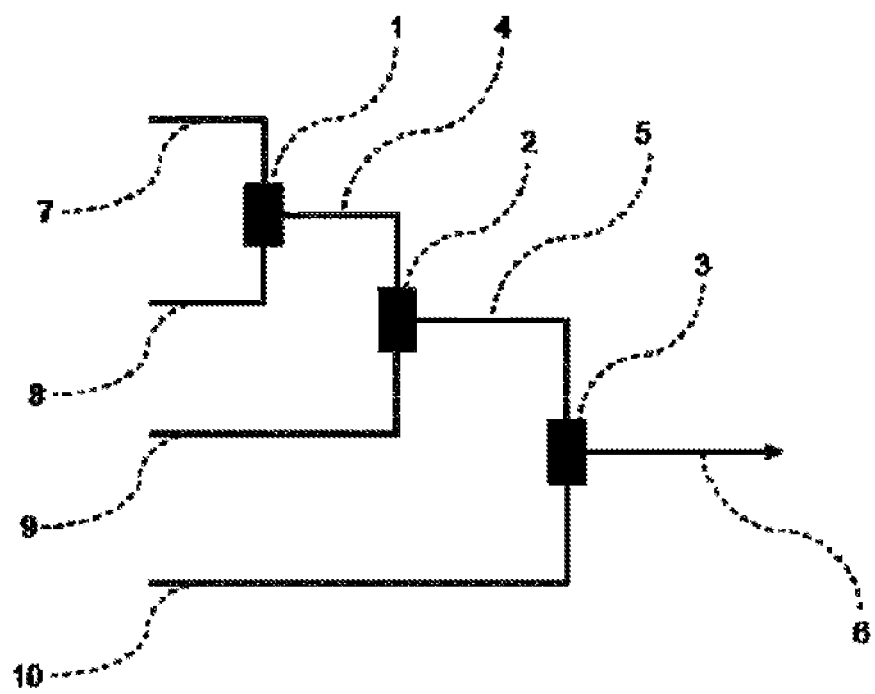

INK AND INK SET

TECHNICAL FIELD

The present invention relates to an ink that can be used for producing prints.

BACKGROUND ART

In the industry, a method of performing printing on packaging materials and advertising media using an ink jet printer has been considered. Examples of the packaging material include a cardboard sheet and a cardboard box adhered in a state where a paperboard processed into a wave shape is sandwiched between two paperboards.

Examples of the cardboard include a cardboard made of a paperboard that easily absorbs a solvent contained in the ink, and a cardboard provided with a colored layer that hardly absorbs the solvent in the ink on the surface of the paperboard.

As an ink usable for printing such as cardboard, for example, there has been known an ink composition for ink jet recording obtained by mixing an aqueous emulsion resin having a glass transition temperature of 16° C. or higher and an acid value of 10 mg KOH/g or more and a pigment to have a solid content of 15% by weight or more, and mixing amino alcohol as a dispersion stabilizer (refer to, for example, Patent Literature 1).

In a case of printing by the ink jet recording method on the surface of the above-described cardboard, in order to prevent contact with the cardboard surface and the ink jet head usually resulting from the warp or the like of a sheet-like cardboard, it is often required to secure the distance of preferably 2 mm or more, and more preferably 3 mm or more.

However, if the distance is long, generally the distance until the ink discharged from the ink discharge port of the ink jet head lands on the surface of the board becomes long, and therefore the flight deflection of the ink droplet which may occur until the landing is likely to be excessively generated and the spread of the ink on the surface of the cardboard is insufficient, which may cause a problem such as occurrence of streaks on the print.

In particular, in a case of using a non-absorbable or hardly absorbable recording medium such as a cardboard provided with a colored layer that hardly absorbs the solvent in the ink on the surface of the paper board as a recording medium, the ink which has landed is difficult to be absorbed by the recording medium, and is difficult to wet and spread on the surface of the recording medium, and thus the occurrence of the streaks may be significantly observed.

CITATION LIST

Patent Literature

PTL 1: JP-A-2011-12226

SUMMARY OF INVENTION

Technical Problem

The problem to be solved by the present invention is to provide an ink that can be used for producing prints having no streaks even in a case where the distance between the surface of a recording medium such as a cardboard and an ink jet head is long.

Solution to Problem

The present invention relates to an ink for use in an ink jet recording method in which the distance from a surface (x) having an ink discharge port of an ink jet head to a position (y) where a line perpendicular to the surface (x) intersects with a recording medium is 2 mm or more, the ink having a viscosity in the range of 2 mPa·s or more and less than 9 mPa·s and a surface tension in the range of 20 mN/m to 40 mN/m.

Advantageous Effects of Invention

With the ink of the present invention, even in a case where the distance between the surface of the recording medium and the ink jet head is long, a print can be produced without streaks, and thus it can be suitably used for printing on a recording medium such as a cardboard in usual or a cardboard provided with a colored layer that hardly absorbs a solvent in the ink.

BRIEF DESCRIPTION OF DRAWINGS

FIG. 1 is a schematic view of a microreactor used in the present invention.

DESCRIPTION OF EMBODIMENTS

The ink of the present invention is an ink for use in an ink jet recording method in which the distance from a surface (x) having an ink discharge port of an ink jet head to a position (y) where a line perpendicular to the surface (x) intersects with a recording medium is 2 mm or more. The ink has a viscosity in the range of 2 mPa·s or more and less than 9 mPa·s and a surface tension in the range of 20 mN/m to 40 mN/m.

In the ink jet recording method that can use the ink of the present invention, it is possible to use an ink jet recording apparatus having a configuration in which the distance (gap) from the surface (x) having the ink discharge port of the ink jet head to the position (y) where the line perpendicular to the surface (x) intersects with the recording medium is 2 mm or more, and is preferably 3 mm or more.

Regarding the distance from the surface (x) to the position (y) where the line perpendicular to the surface (x) intersects the recording medium, a lower limit of the distance is preferably 3 mm or more, and an upper limit of the distance is preferably 10 mm or less and is particularly preferably 5 mm or less in order to produce a print in which even if the recording medium is large and easily warped, contact between the surface of the recording medium and the ink discharge port is prevented to effectively prevent ink discharge defects due to damage to the ink discharge port and deterioration of a water repellent function often provided in the ink discharge port, and even in a case where the distance between the surface of the recording medium and the ink jet head is long, the occurrence of the streaks is not observed.

The ink for use in the ink jet recording method has a viscosity in the range of 2 mPa·s or more and less than 9 mPa·s and a surface tension in the range of 20 mN/m to 40 mN/m.

The ink of the present invention for use may have a viscosity lower limit of 2 mPa·s or more, preferably of 3 mPa·s or more, more preferably of 4 mPa·s or more at 32° C. On the other hand, the ink for use may have a viscosity upper limit of less than 9 mPa·s, preferably of 8 mPa·s or less, more preferably of 7 mPa·s or less at 32° C.

Since the ink having the viscosity in the above range has a sufficient volume of droplets discharged from the ink jet head, even when the distance from the surface (x) having the ink discharge port of the ink jet head to the position (y) where the line perpendicular to the surface (x) intersects with the recording medium is 2 mm or more, it is possible to apparently reduce the deviation of the landing position on the recording medium caused by the flight deflection, and effectively prevent the occurrence of streaks on the print.

In addition, since the ink having the viscosity in the above range is further excellent in terms of the storage stability and the discharge stability of the ink, it can be suitably used, for example, for printing by an ink jet method.

The viscosity of the ink was measured under the following conditions using a conical flat plate (cone and plate) rotational viscometer corresponding to an E-type viscometer.

Measurement apparatus: TVE-25 type viscometer (manufactured by TOKI SANGYO CO., LTD., TVE-25 L)
Standard solution for calibration: JS20
Measurement temperature: 32° C.
Rotation speed: 10 to 100 rpm
Injection amount: 1,200 μL In addition, as the ink of the present invention, those in which a lower limit of the surface tension at 25° C. is 20 mN/m or more, and is more preferably 25 mN/m or more, and is still more preferably 28 mN/m or more are used. On the other hand, those in which an upper limit of the surface tension of the ink at 25° C. is 40 mN/m or less, is preferably 35 mN/m or less, and is more preferably 32 mN/m or less are used.

The ink having the surface tension in the above range is excellent in wettability of the discharged droplets on the surface of the recording medium, and has sufficient wetting and spreading after landing. As a result, even when the distance from the surface (x) having the ink discharge port of the ink jet head to the position (y) where the line perpendicular to the surface (x) intersects with the recording medium is 2 mm or more, it is possible to apparently reduce the deviation of the landing position on the recording medium caused by the flight deflection of the discharged droplets, and effectively prevent the occurrence of streaks on the print.

The surface tension of the ink refers to a value measured under the following conditions using an automatic surface tension meter to which a Willhermi method is applied. According to the Will-Hermi method, static surface tension and dynamic surface tension can be measured, but the surface tension of the above-described ink in the present invention represents the value of static surface tension.
Measurement apparatus: Automatic surface tension meter (manufactured by Kyowa Interface Science, Inc, CBVP-Z type)
Measurement temperature: 25° C.
Probe: Platinum plate As the above-described ink, any of those having the above viscosity and surface tension can be used. For example, an ink containing a colorant (D) and a solvent such as an aqueous medium (C) can be used. Among them, as the ink, an ink further containing a binder resin (A) is preferably used in order to obtain a print having the excellent scratch resistance, and an ink further containing a compound (B) having a urea bond is more preferably used in order to improve the settability of the print.

As the above-described ink, those containing the binder resin (A), the compound (B), the colorant (D), and the like which are present in a state of being dissolved or dispersed in the aqueous medium (C) which is a solvent are preferably used.

As the binder resin (A), for example, one or more kinds of polyvinyl alcohol, gelatin, polyethylene oxide, polyvinyl pyrrolidone, an acrylic resin, a urethane resin, dextran, dextrin, color ginan (κ, t, λ, or the like), agar, pullulan, water-soluble polyvinyl butyral, hydroxyethyl cellulose, and carboxymethyl cellulose can be used in combination. Among them, as the binder resin (A), an acrylic resin is preferably used, and an acrylic resin having an amide group is preferably used.

Since the ink flows again to the discharge port even in a case where the ink at the ink discharge port is solidified due to solvent evaporation by drying, the ink containing the binder resin (A) is excellent in the properties (redispersibility) which allow easy dispersion of the solidified product in the ink. As a result, when discharging from the ink jet head, even in a case where the discharge is interrupted for a certain period and then restarted, it is difficult to cause the flight deflection of the discharged droplets or to block the discharge port, and it is possible to effectively prevent the occurrence of the streaks on the print.

As the acrylic resin having an amide group, an acrylic monomer having an amide group and a polymer with other monomers as needed can be used.

As the acrylic monomer having an amide group, for example, (meth)acrylamide, N-methyl (meth)acrylamide, N-ethyl (meth)acrylamide, N-propyl (meth)acrylamide, N-methylol (meth), acrylamide, N-isopropyl (meth)acrylamide, N-butyl (meth)acrylamide, N,N-dimethyl (meth)acrylamide, N,N-diethyl (meth)acrylamide, N,N-dipropyl (meth)acrylamide, N,N-dimethyl aminopropyl (meth)acrylamide, diacetone (meth)acrylamide, and hydroxyethyl (meth)acrylamide can be used.

As other monomers that can be used for preparing the acrylic resin, for example, a (meth)acrylic acid ester monomer such as (meth)acrylic acid or an alkali metal salt thereof, methyl (meth)acrylate, ethyl (meth)acrylate, butyl (meth)acrylate, 2-ethyl hexyl (meth)acrylate, benzyl (meth)acrylate, and cyclohexyl (meth)acrylate; and an acrylic monomer having an amide group such as acrylamide and N,N-dimethyl (meth)acrylamide; an crylic monomer such as (meth) acrylonitrile, 2-dimethyl aminoethyl (meth)acrylate, and glycidyl (meth)acrylate can be used.

As other monomers that can be used for preparing the acrylic resin, for example, an aromatic vinyl compound such as styrene, α-methyl styrene, p-tert-butyl styrene, vinyl naphthalene, and vinyl anthracene, a vinyl sulfonic acid compound such as vinyl sulfonic acid and styrene sulfonic acid, a vinyl pyridine compound such as 2-vinyl pyridine, 4-vinyl pyridine, and naphthyl vinyl pyridine, vinyl triethoxysilane, vinyl trimethoxysilane, p-styryl trimethoxysilane, 3-methacryloxypropyl methyl dimethoxysilane, 3-methacryloxypropyl trimethoxysilane, 3-methacryloxypropyl methyl diethoxysilane, 3-methacryloxypropyl triethoxysilane, and 3-acryloxypropyl trimethoxysilane can be used.

As the other monomer, it is preferable to use a monomer having an aromatic group such as styrene or benzyl (meth)acrylate in order to further improve the affinity to the pigment.

The acrylic resin having an amide group imparts an effect of improving the redispersibility to the ink of the present invention, and is excellent in the dispersion stability in the aqueous medium (C). As the acrylic resin having an amide group, from the viewpoint of further improving the redispersibility of the ink and the dispersion stability of the ink component in the aqueous medium (C), an acrylic monomer having an amide group is preferably used in the range of 0.5% by mass or more and 5% by mass, is more preferably 0.5% by mass to 4% by mass, and is particularly preferably 1.5% by mass to 3% by mass, with respect to the total amount of the above-described monomer used for the preparation.

In addition, the acrylic resin may contain a component which is insoluble in tetrahydrofuran (THF), which is a developing solvent at the time of molecular weight measurement by gel permeation chromatography, and of which the molecular weight is difficult to measure, and from the view point of further improving the adhesion of the ink to plastic or metal that is difficult to absorb solvents such as water contained in the ink, or highly hydrophobic coated paper or art paper, the content of a THF insoluble component at 25° C. is preferably less than 20% by mass, and is more preferably less than 5% by mass. It is most preferably not to contain the THF insoluble components.

As the acrylic resin, a number average molecular weight of the acrylic resin dissolved in the THF is preferably 10,000 to 100,000 and the number average molecular weight is more is preferably 20,000 to 100,000. Further, as the acrylic resin, a weight average molecular weight is preferably 30,000 to 1,000,000, and the weight average molecular weight is more preferably 50,000 to 1,000,000.

For example, polyolefin can also be used as the binder resin (A).

As the polyolefin, a polymer or a copolymer of a monomer which has an olefin monomer as a main component is used. As the olefin monomer, for example, α-olefin such as ethylene, propylene, butene, hexene, methyl butene, methyl pentene, and methyl hexene, and cyclic olefin such as norbornene can be used. As the polyolefin, oxidized polyolefin can also be used.

As the oxidized polyolefin, for example, those in which an oxygen atom is introduced into the molecule by subjecting polyolefin to thermal decomposition or chemical decomposition using an acid or alkali component can be used. The oxygen atom constitutes, for example, a carboxyl group having polarity.

As the polyolefin, it is preferable to use one having a melting point of 90° C. to 200° C., and even in a case where the print is superimposed immediately after printing by using one having a melting point of 120° C. to 160° C., it is possible to impart excellent settability that the ink on the surface of the recording medium does not peel off and excellent scratch resistance. In addition, the melting point of the polyolefin is a value measured by the melting point measurement apparatus based on JIS K 0064.

The polyolefin is preferably present in a dissolved or dispersed state in a solvent such as an aqueous medium (C) as described above, and more preferably in the state of an emulsion dispersed in a solvent such as the aqueous medium (C).

In that case, the polyolefin particles formed of the above polyolefin preferably have an average particle diameter of 10 nm to 200 nm, and the average particle diameter is more preferably 30 nm to 150 nm in order to achieve, for example, both excellent discharge stability of the ink when printing by the ink jet recording method and excellent settability after printing. In addition, the average particle diameter of the polyolefin (A) indicates a value measured by a dynamic light scattering method, using the Microtrac UPA particle size distribution analyzer manufactured by Nikkiso Co., Ltd.

In order to prevent the occurrence of the streaks, improve the print density and the scratch resistance of the print, and impart excellent glossiness, the binder resin (A) is preferably used in the range of 2% by mass to 7% by mass, and is more preferably in the range of 2% by mass to 5% by mass, with respect to the total amount of the ink. In addition, when the binder resin (A) crosslinks and forms a firm film through a heating step, the ink containing the binder resin (A) in the above range can further improve the scratch resistance of the print. Further, even in a case where water is dropped onto the print or the print is rubbed with a cloth or the like containing water, it is possible to impart excellent water resistance so that the ink on the surface of the recording medium does not peel off.

As the ink of the present invention, a compound (B) having a urea bond can be used in combination with the binder resin (A). By using the compound (B) and the binder resin (A) in combination, it is possible to impart excellent settability of print and excellent scratch resistance.

As the compound (B) having the urea bond, urea or a urea derivative can be used.

As the urea derivative, for example, ethylene urea, propylene urea, diethyl urea, thiourea, N,N-dimethyl urea, hydroxyethyl urea, hydroxybutyl urea, ethylene thiourea, diethyl thiourea, and the like can be used alone or two or more kinds thereof can be used in combination.

Among them, it is particularly preferable to use urea, ethylene urea, or 2-hydroxyethyl urea as the compound (B), in order to obtain a print having a further excellent settability.

In order to obtain a print excellent in the discharge stability and settability required in a case where the ink of the present invention is discharged by the ink jet recording method, the content of the compound (B) is preferably 1% by mass to 20% by mass, is more preferably 2% by mass to 15% by mass, and is still more preferably 3% by mass to 10% by mass with respect to the entire ink amount.

The binder resin (A) and the compound (B) are preferably used in such a range that the mass ratio [binder resin (A)/compound (B)] is 1/6 to 6/1, and is more preferably used in the range of 1/5 to 1/1, in order to achieve an effect of improving the settability of the print.

In addition, since the urea and the urea derivative have a high moisturizing function and function as a wetting agent, drying and solidification of the ink at the ink discharge port of the ink jet head can be prevented, and thus excellent discharge stability can be ensured. As a result, even if the distance from the surface (x) having the ink discharge port of the ink jet head to the position (y) where the line perpendicular to the surface (x) intersects with the recording medium is 2 mm or more, there is an effect of reducing the occurrence of streaks on the print.

On the other hand, since the urea and the urea derivative easily release water when heated, it is preferable to heat and dry after printing the ink of the present invention on the non-absorbable or hardly absorbable recording medium in order to obtain the print provided with the further excellent settability.

As the ink of the present invention, one containing an aqueous medium (C) as a solvent is used.

As the aqueous medium (C), water can be used alone, or a mixed solvent of water and an organic solvent (F) described later can be used.

Specifically, pure water such as ion exchange water, ultrafiltered water, reverse osmosis water, distilled water or ultrapure water can be used as the water.

The aqueous medium (C) is preferably used in the range of 1% by mass to 30% by mass, and particularly preferably used in the range of 5% by mass to 25% by mass with respect to the total amount of the ink in order to obtain an ink capable of producing a clear print having excellent settability and the high discharge stability required for discharging by the ink jet method.

As the organic solvent (F), for example, ketones such as acetone, methyl ethyl ketone, methyl butyl ketone, and methyl isobutyl ketone; alcohols such as ethanol, 2-propanol, 2-methyl-1-propanol, 1-butanol and 2-methoxyethanol; ethers such as tetrahydrofuran, 1,4-dioxane, 1,2-dimethoxyethane; glycols such as dimethyl formamide, N-methyl pyrrolidone, ethylene glycol, diethylene glycol, triethylene glycol, tetraethylene glycol, propylene glycol, polyethylene glycol, and polypropylene glycol; diols such as butanediol, pentanediol, hexanediol and diols similar to these; glycol esters such as propylene glycol laurate; glycol ethers such as cellosolve including diethylene glycol monoethyl, diethylene glycol monobutyl ether, diethylene glycol monohexyl ether, propylene glycol ether, dipropylene glycol ether, and triethylene glycol ether; alcohols such as methanol, ethanol, isopropyl alcohol, 1-propanol, 2-propanol, butyl alcohol such as 1-butanol and 2-butanol, pentyl alcohol, and alcohols similar to these; sulfolane; lactones such as γ-butyrolactone; and lactams such as N-(2-hydroxyethyl) pyrrolidone can be used alone or two or more kinds thereof can be used in combination.

Further, as the organic solvent (F), a water soluble organic solvent (f1) having a boiling point of 100° C. to 200° C. and 0.5 hPa or more of steam pressure at 20° C. is preferably used to obtain a quick drying effect of quickly drying on the recording medium after the discharged droplets land on the surface of the recording medium.

Examples of the water soluble organic solvent (f1) include 3-methoxy-1-butanol, 3-methyl-3-methoxy-1-butanol, 3-methoxy-3-methyl-1-butyl acetate, ethylene glycol monomethyl ether, ethylene glycol monoethyl ether, ethylene glycol monopropyl ether, ethylene glycol monobutyl ether, ethylene glycol monoisobutyl ether, ethylene glycol-t-butyl ether, propylene glycol monomethyl ether, propylene glycol monoethyl ether, propylene glycol monopropyl ether, propylene glycol monomethyl ether acetate, diethylene glycol dimethyl ether, diethylene glycol methyl ethyl ether, diethylene glycol diethyl ether, dipropylene glycol dimethyl ether, 4-methoxy-4-methyl-2-pentanone, and ethyl lactate, and two or more kinds of these can be used in combination.

Among them, as the water soluble organic solvent (f1), in order to maintain excellent dispersion stability of the ink, and suppress the deterioration, of an ink discharge nozzle provided in the ink jet apparatus, due to the influence of the solvent contained in the ink, a water soluble organic solvent in which the hydrogen bond term $\delta_H$ of HSP (Hansen solubility parameter) is 6 to 20.

Specifically, the water soluble organic solvent having a hydrogen bond term of HSP in the above range is preferably 3-methoxy-1-butanol, 3-methyl-3-methoxy-1-butanol, ethylene glycol monomethyl ether, ethylene glycol monoethyl ether, ethylene glycol monopropyl ether, ethylene glycol monobutyl ether, ethylene glycol monoisobutyl ether, ethylene glycol-t-butyl ether, propylene glycol monomethyl ether, propylene glycol monoethyl ether, or propylene glycol monopropyl ether, more preferably 3-methoxy-1-butanol or 3-methyl-3-methoxy-1-butanol.

As an organic solvent which can be used in combination with the aqueous medium (C), in addition to the water soluble organic solvent (f1) described above, or together with the water soluble organic solvent (f1), propylene glycol (f2) and one or more organic solvents (f3) selected from the group consisting of glycerin, a glycerin derivative, diglycerin, and a diglycerin derivative are preferably used in combination in order to achieve both the effect of quick drying the ink on the recording medium and the effect of preventing drying and solidification of the ink at the ink discharge port.

As the organic solvent (f3), for example, glycerin, diglycerin, polyglycerin, diglycerin fatty acid ester, polyoxypropylene (n) polyglyceryl ether represented by General Formula (1), polyoxyethylene (n) polyglyceryl ether represented by General Formula (2) can be used alone or two or more kinds thereof can be used in combination.

Among them, as the organic solvent (f3), it is particularly preferable to use glycerin and a polyoxypropylene (n) polyglyceryl ether of n=8 to 15 in order to exhibit the excellent settability of the print and the effect of preventing drying and solidification of the ink at the ink discharge port.

[Chem. 1]

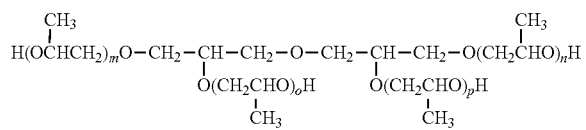

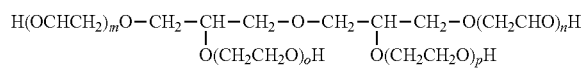

In General Formula (1) and General Formula (2), m, n, o, and p each independently represent an integer of 1 to 10.

The organic solvent (F) is preferably used in the range of 1% by mass to 30% by mass with respect to the total amount of the ink print, and is particularly preferably used in 5% by mass to 25% by mass in order in order to exhibit the excellent settability of the print and the effect of preventing drying and solidification of the ink at the ink discharge port.

The water soluble organic solvent (f1), the propylene glycol (f2), and the organic solvent (f3) are preferably used in the range of 1/25 to 1/1 of the mass ratio [water soluble organic solvent (f1)/propylene glycol (f2)], and particularly preferably used in the range of 1/20 to 1/1 in order to in order to exhibit the excellent settability of the print and the effect of preventing drying and solidification of the ink at the ink discharge port.

Further, the water soluble organic solvent (f1), the propylene glycol (f2), and the organic solvent (f3) are preferably used in the range of 1/4 to 8/1 of the mass ratio [propylene glycol (f2)/organic solvent (f3)], and particularly preferably used in the range of 1/2 to 5/1 in order to exhibit the excellent settability of the print and the effect of preventing drying and solidification of the ink at the ink discharge port.

As a colorant (D) which can be used by the ink of present invention, a well-known and usual pigment, dye, and the like can be used. Among them, as the colorant (D), it is preferable to use a pigment in order to produce a print excellent in weather resistance and the like. Moreover, as the colorant (D), a coloring agent in which the pigment is coated with a resin can also be used.

The pigment is not particularly limited, and an organic pigment or an inorganic pigment generally used in an aqueous gravure ink and an aqueous ink jet recording ink can be used.

In addition, as the pigment, either a non-acid treated pigment or an acid treated pigment can be used.

As the inorganic pigment, for example, iron oxide, carbon black prepared by a method such as a contact method, a furnace method, or a thermal method can be used.

As the organic pigment, for example, an azo pigment (including azo lake, an insoluble azo pigment, a condensed azo pigments, a chelate azo pigments, and the like), a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, and a quinofarone pigment), a lake pigment (such as basic dye type chelate and acid dye type chelate), a nitro pigment, a nitroso pigment, and aniline black can be used.

Among the above pigments, as the carbon black which can be used for a black ink, No. 2300, No. 2200B, No. 900, No. 960, No. 980, No. 33, No. 40, No. 45, No. 45L, No. 52, HCF 88, MA 7, MA 8, and MA 100 which are prepared by Mitsubishi Chemical Corporation, Raven 5750, Raven 5250, Raven 5000, Raven 3500, Raven 1255, and Raven 700 which are prepared by Columbia, Regal 400R, Regal 330R, Regal 660R, Mogul L, Mogul 700, Monarch 800, Monarch 880, Monarch 900, Monarch 1000, Monarch 1100, Monarch 1300, and Monarch 1400 which are prepared by Cabot Corporation, Color Black FW1, Color Black FW2, Color Black FW2V, Color Black FW18, Color Black FW200, Color Black S150, Color Black S160, Color Black S170, Printex 35, Printex U, Printex V, Printex 1400U, Special Black 6, Special Black 5, Special Black 4, Special Black 4A, NIPEX 150, NIPEX 160, NIPEX 170, and NIPEX 180 which are prepared by Evonik Degussa Gmbh can be used.

In addition, specific examples of pigments that can be used for a yellow ink include C.I. Pigment Yellows 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of pigments that can be used for a magenta ink include C.I. Pigment Reds 5, 7, 12, 48 (Ca), 48 (Mn), 57 (Ca), 57:1, 112, 122, 123, 146, 168, 176, 184, 185, 202, 209, 269, and 282, C.I. Pigment Violet 19.

Specific examples of pigments that can be used for a cyan ink include C.I. Pigment Blues 1, 2, 3, 15, 15:3, 15:4, 16, 22, 60, 63, and 66.

Specific examples of pigments that can be used for a while ink include silicas such as alkaline earth metal sulfates, carbonates, finely divided silicic acid, and synthetic silicates, calcium silicate, alumina, alumina hydrate, titanium oxide, zinc oxide, talc, and clay. These may be surface treated.

The pigment is preferably provided with means for well dispersing in the aqueous medium (C) in order to stably exist in the ink.

Examples of the means include (i) A method of dispersing a pigment together with a pigment dispersant in an aqueous medium (C) by a dispersing method described later; and (ii) A method of dispersing and/or dissolving a self-dispersed pigment having a dispersibility imparting group (hydrophilic functional group and/or a salt thereof) directly or indirectly bonded via an alkyl group, an alkyl ether group, or an aryl group on the surface of the pigment into the aqueous medium (C).

As the self-dispersed pigment, for example, those obtained by subjecting the pigment to a physical treatment or a chemical treatment, and bending (grafting) the dispersibility imparting group or active species having the dispersibility imparting group bonded (grafted) to the surface of the pigment can be used. The self-dispersed pigment can be prepared by, for example, a vacuum plasma treatment, an oxidation treatment with hypohalous acid and/or hypohalite, an oxidation treatment with ozone, a wet oxidation method of oxidizing the pigment surface with an oxidizing agent in water, and a method of bonding carboxyl group through phenyl group by bonding p-aminobenzoic acid to pigment surface.

An aqueous ink containing a self-dispersed pigment does not need to contain the pigment dispersant, and thus there is almost no foaming or the like caused by the pigment dispersant, and it is easy to prepare an ink excellent in the discharge stability. In addition, the aqueous ink containing the self-dispersed pigment is easy to handle, and as significant viscosity increase due to pigment dispersant is suppressed, it can contain more pigment, and thus can be used for the production of prints with high print density.

It is also possible to use commercial products as the self-dispersed pigment, and examples of such commercial products include MICROJET CW-1 (trade name; manufactured by Orient Chemical Industries, Ltd.), CAB-O-JET 200, CAB-O-JET 300 (trade name; manufactured by Cabot Corporation).

In the present invention, when the composition of the ink is excessively changed in order to prevent the occurrence of the streaks, the print density and the scratch resistance of the print may tend to be slightly reduced. In order to prevent the occurrence of the streaks, maintain the excellent dispersion stability of the colorant (D), and improve the print density and the scratch resistance of the print, the colorant (D) is preferably used in the range of 1% by mass to 20% by mass, and is more preferably in the range of 2% by mass to 10% by mass, with respect to the total amount of the ink.

(Pigment Dispersant)

The pigment dispersant can be suitably used when a pigment is used as the colorant (D).

As the pigment dispersant, for example, polyvinyl alcohols, polyvinyl pyrrolidones, an acrylic resin such as an acrylic acid-acrylic ester copolymer, a styrene-acrylic resin such as a styrene-acrylic acid copolymer, a styrene-methacrylic acid copolymer, a styrene-methacrylic acid-acrylic acid ester copolymer, a styrene-α-methyl styrene-acrylic acid copolymer, and a styrene-α-methyl styrene-acrylic acid-acrylic acid ester copolymer, an aqueous resin such as a styrene-maleic acid copolymer, a styrene-maleic anhydride copolymer, and a vinylnaphthalene-acrylic acid copolymer, and a salt of the aqueous resin can be used. As the pigment dispersant, AZSPAR PB series, product prepared by Ajinomoto Fine Techno Co., Ltd., Disperbyk Series prepared by BYK-Chemie Japan K. K, EFKA series prepared by BASF Japan Ltd., SOLSPERSE series prepared by The Lubrizol Corporation, and TEGO series prepared by Evonik can be used.

As the pigment dispersant, coarse particles can be significantly reduced, and as a result, a polymer (G) described later is preferably used in order to impart excellent discharge stability required in a case where the ink of the present invention is discharged by an ink jet method.

As the polymer (G), polymers having an anionic group can be used, and among them, a polymer in which the solubility in water is 0.1 g/100 ml or less, and a number average molecular weight is in the range of 1000 to 6000, enough to form a fine particle in water when the neutralization rate of the anionic group with a basic compound is set to 100% is preferably used.

The solubility of the polymer (G) in water was defined as follows. That is, 0.5 g of the polymer (E) whose particle diameter is adjusted in the range of 250 μm to 90 μm using a sieve with openings of 250 μm and 90 μm was enclosed in a bag processed with a wire mesh having 400 mesh, immersed in 50 ml of water, and gently stirred and left at a temperature of 25° C. for 24 hours. After immersing for 24 hours, the wire mesh having 400 mesh enclosing the polymer (E) was dried for 2 hours with a dryer set at 110° C. The change in weight before and after immersion in water of the wire mesh having 400 mesh enclosing the polymer (E) was measured, and the solubility was calculated by the following equation.

Solubility (g/100 ml)=(wire mesh (g) having 400 mesh enclosing polymer before immersing−wire mesh (g) having 400 mesh enclosing polymer after immersing)×2    [Equation 1]

In addition, in the present, invention, whether to form fine particles in water when the neutralization rate of the anionic group with a basic compound was set to 100% was determined as follows.
(1) An acid value of the polymer (G) is measured in advance by a method of measuring an acid value based on a JIS test method K 0070-1992. Specifically, 0.5 g of the polymer (G) is dissolved in tetrahydrofuran, and titrated with a 0.1 M potassium hydroxide alcohol solution using phenolphthalein as an indicator to obtain the acid value.
(2) After adding 1 g of the polymer (G) to 50 ml of water, 0.1 mol/L of potassium hydroxide aqueous solution enough to neutralize the obtained acid value by 100% is added to make 100% neutralized solution.
(3) The 100% neutralized solution was irradiated with ultrasonic waves in an ultrasonic cleaner (ultrasonic cleaner US-102 manufactured by SND Corporation, 38 kHz self-oscillation) at a temperature of 25° C. for 2 hours and left for 24 hours at room temperature.

After leaving for 24 hours, a sample liquid obtained by sampling a liquid at a depth of 2 centimeters from the liquid surface is used to determine whether light scattering information can be obtained by using a dynamic light scattering particle size distribution measuring apparatus (dynamic light scattering particle diameter measuring apparatus, "Microtrac particle size distribution analyzer UPA-ST150", manufactured by Nikkiso Co., Ltd.) to make sure the presence of the fine particle.

In order to further improve the stability of the fine particles formed by the polymer (G) used in the present invention in water, the particle diameter of the fine particles is preferably in the range of 5 nm to 1,000 nm, is more preferably in the range of 7 nm to 700 nm, and is most preferably in the range of 10 nm to 500 nm. Further, the particle size distribution of the fine particle tends to be more excellent in the dispersion stability when the particle size is narrower, but even when the particle size distribution is wide, it is possible to obtain an ink having the dispersion stability superior to the conventional one. Similar to the method of measuring the fine particles, the particle diameter and the particle size distribution were measured using the dynamic light scattering particle size distribution measuring apparatus (dynamic light scattering particle diameter measuring apparatus, "Microtrac particle size distribution analyzer UPA-ST150", manufactured by Nikkiso Co., Ltd.).

The neutralization rate of the polymer (G) used in the present invention was determined by the following equation.

Neutralization rate (%)={(mass (g) of basic compound×56×1,000)/(acid value (mgKOH/g) of the polymer ($E$)×equivalent amount of basic compound×mass (g) of the polymer ($E$))}×100    [Equation 2]

Further, the acid value of the polymer (G) was measured based on the JIS test method K 0070-1992. Specifically, 0.5 g of sample is dissolved in tetrahydrofuran, and titrated with a 0.1 M potassium hydroxide alcohol solution using phenolphthalein as an indicator to obtain the acid value.

The number average molecular weight of the polymer (G) is preferably in the range of 1,000 to 6,000, is more preferably 1,300 to 5,000, and is still more preferably 1,500 to 4,500 in order to obtain an ink which can effectively suppress the aggregation and the like of the colorant (D) such as a pigment in the aqueous medium (C), and has the excellent dispersion stability of the colorant (D).

In addition, the number average molecular weight is set as a value of polystyrene conversion measured by gel permeation chromatography (GPC), and specifically, is set as a value measured under the following conditions.
(Method of Measuring Number Average Molecular Weight (Mn))
The measurement was performed under the following conditions by gel permeation chromatography (GPC) method.
Measurement apparatus: high speed GPC apparatus ("HLC-8220GPC" manufactured by TOSOH CORPORATION)
Column: the following columns manufactured by TOSOH CORPORATION were used by being connected in series.
"TSKgel G 5000" (7.8 mm I.D.×30 cm)×1
"TSKgel G 4000" (7.8 mm I.D.×30 cm)×1
"TSKgel G 3000" (7.8 mm I.D.×30 cm)×1
"TSKgel G 2000" (7.8 mm I.D.×30 cm)×1
Detector: RI (differential refractometer)
Column temperature: 40° C.
Eluent: tetrahydrofuran
Flow rate: 1.0 mL/min
Injection volume: 100 μL (tetrahydrofuran solution having a sample concentration of 0.4% by mass)
Standard sample: a calibration curve was prepared using the following standard polystyrene.
(Standard Polystyrene)
"TSKgel standard polystyrene F-500" manufactured by TOSOH CORPORATION
"TSKgel standard polystyrene F-1000" manufactured by TOSOH CORPORATION
"TSKgel standard polystyrene F-2500" manufactured by TOSOH CORPORATION
"TSKgel standard polystyrene F-5000" manufactured by TOSOH CORPORATION
"TSKgel standard polystyrene F-1" manufactured by TOSOH CORPORATION
"TSKgel standard polystyrene F-2" manufactured by TOSOH CORPORATION
"TSKgel standard polystyrene F-4" manufactured by TOSOH CORPORATION
"TSKgel standard polystyrene F-10" manufactured by TOSOH CORPORATION
"TSKgel standard polystyrene F-20" manufactured by TOSOH CORPORATION
"TSKgel standard polystyrene F-40" manufactured by TOSOH CORPORATION
"TSKgel standard polystyrene F-80" manufactured by TOSOH CORPORATION
"TSKgel standard polystyrene F-128" manufactured by TOSOH CORPORATION
"TSKgel standard polystyrene F-288" manufactured by TOSOH CORPORATION
"TSKgel standard polystyrene F-550" manufactured by TOSOH CORPORATION The polymer (G) to be used is preferably such that the ink containing it has a surface tension of 30 dyn/cm or more, more preferably a surface tension of 40 dyn/cm or more, particularly preferably a surface tension of 65 dyn/cm to 75 dyn/cm, which is close to the surface tension of water. Note that, the surface tension is a value measured about a polymer solution obtain in such a manner that after adding 1 g of the polymer (G) to water, 0.1 mol/L of potassium hydroxide aqueous solution enough to neutralize the obtained acid value by 100% was added to make 100% neutralized solution.

As the polymer (G), it is possible to use a polymer that is insoluble or hardly soluble in water and that forms fine particles in 100% neutralized state, but it is not particularly limited as long as it is a polymer having a hydrophobic group in one molecule in addition to an anionic group which is a hydrophilic group.

Examples of such a polymer include a block polymer having a polymer block having a hydrophobic group and a polymer block having an anionic group. In the polymer (G), the number of anionic groups and the solubility in water are not necessarily specified by the acid value or the number of anionic groups at the time of design of the polymer, for example, even if the polymers have the same acid values, those having low molecular weight tend to have high solubility in water, and those having high molecular weight tend to have low solubility in water. From this, in the present invention, the polymer (G) is specified by the solubility in water.

The polymer (G) may be a homopolymer, and is preferably a copolymer, and it may be a random polymer, a block polymer or an alternating polymer. Among them, a block polymer is preferable. In addition, the polymer may be a branched polymer, and is preferably a linear polymer.

In addition, the polymer (G) is preferably a vinyl polymer in terms of freedom of design, and as a method of preparing the vinyl polymer having the molecular weight and solubility properties desired in the present invention, it is preferable to perform the preparation by using "living polymerization", such as living radical polymerization, living cationic polymerization, and living anionic polymerization.

Among them, the polymer (G) is preferably a vinyl polymer prepared by using a (meth)acrylate monomer as one of raw materials, and as a method for preparing such a vinyl polymer, living radical polymerization and living anion polymerization are preferable, and from the viewpoint of precisely designing the molecular weight and each segment of the block polymer, the living anion polymerization is more preferable.

Specifically, the polymer (G) prepared by the living anionic polymerization is a polymer represented by General Formula (3).

[Chem. 2]

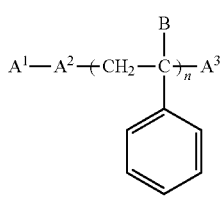

(3)

In General Formula (3), $A^1$ represents an organic lithium initiator residue, $A^2$ represents a polymer block of a monomer having an aromatic ring or a heterocyclic ring, $A^3$ represents a polymer block containing an anionic group, n represents an integer of 1 to 5, and B represents an aromatic group or an alkyl group.

In General Formula (3), $A^1$ represents an organic lithium initiator residue. Specific examples of the organic lithium initiator include an alkyl lithium magnesium complex such as alkyl lithium such as methyl lithium, ethyl lithium, propyl lithium, butyl lithium (n-butyl lithium, sec-butyl lithium, iso-butyl lithium, tert-butyl lithium, and the like), pentyl lithium, hexyl lithium, methoxymethyl lithium, and ethoxymethyl lithium; phenyl alkylene lithium such as benzyl lithium, α-methyl styryl lithium, 1,1-diphenyl-3-methyl pentyl lithium, 1,1-diphenyl hexyl lithium, and phenyl ethyl lithium; alkenyl lithium such as vinyl lithium, allyl lithium, propenyl lithium, and butenyl lithium; alkynyl lithium such as ethynyl lithium, butynyl lithium, pentynyl lithium, and hexynyl lithium; aryl lithium such as phenyl lithium and naphthyl lithium; heterocyclic lithium such as 2-thienyl lithium, 4-pyridyl lithium, and 2-quinolyl lithium; tri(n-butyl) magnesium lithium; and trimethyl magnesium lithium.

In the organic lithium initiator, the bond between the organic group and lithium is cleaved to form an active terminal on the organic group side, from which polymerization is initiated. Therefore, an organic group derived from organic lithium is bonded to the end of the resulting polymer. In the present invention, the organic group derived from the organic lithium bonded to the polymer terminal is referred to as an organic lithium initiator residue. For example, in a case of a polymer using methyl lithium as an initiator, an organic lithium initiator acid group is a methyl group, and in a case of a polymer using butyllithium as an initiator, an organic lithium initiator acid group is a butyl group.

In General Formula (3), $A^2$ represents a polymer block having a hydrophobic group. In addition to the purpose of balancing the appropriate solubility balance as described above, $A^2$ is preferably a group having high adsorption to the pigment when in contact with the pigment, from that point of view, $A^2$ is preferably a polymer block of a monomer having an aromatic ring or a heterocyclic ring.

Specifically, a polymer block of a monomer having an aromatic ring or a heterocyclic ring is a polymer block of a homopolymer or a copolymer obtained by homopolymerizing or copolymerizing a monomer having an aromatic ring such as a styrene monomer or a monomer having a heterocyclic ring such as a vinylpyridine monomer.

Examples of the monomer having an aromatic ring include a styrene monomer such as styrene, p-tert-butyl dimethyl siloxystyrene, o-methyl styrene, p-methyl styrene, p-tert-butyl styrene, p-tert-butoxystyrene, m-tert-butoxystyrene, p-tert-(1-ethoxymethyl) styrene, m-chlorostyrene, p-chlorostyrene, p-fluorostyrene, α-methyl styrene, and p-methyl-α-methyl styrene, vinyl naphthalene, and vinyl anthracene.

Further, examples of the monomer having a heterocyclic ring include a vinylpyridine monomer such as 2-vinylpyridine and 4-vinylpyridine. These monomers can be used alone or two or more kinds thereof can be used in combination.

In General Formula (3), $A^3$ represents a polymer block containing an anionic group. $A^3$ has the purpose of imparting the dispersion stability in water when it becomes a pigment dispersion, in addition to the purpose of imparting appropriate solubility as described above.

Examples of the anionic group in the polymer block $A^3$ include a carboxyl group, a sulfonic acid group, and a phosphoric acid group. Among them, a carboxyl group is preferable in view of its preparation and availability of monomer varieties. In addition, two carboxyl groups may form an acid anhydride group which is dehydrated and condensed in a molecule or between molecules.

The method of introducing the anionic group of $A^3$ is not particularly limited, and for example, in a case where the anionic group is a carboxyl group, it may be a polymer block (PB1) of a homopolymer obtained by homopolymerization of (meth)acrylic acid or a copolymer obtained by copolymerization of (meth)acrylic acid with other monomers, and may be a polymer block (PB2) of a homopolymer obtained by homopolymerization of (meth)acrylate having a protective group that can be regenerated into an anionic group by deprotection, or a copolymer obtained by copolymerization of (meth)acrylate having a protective group that can be regenerated into an anionic group by deprotection with other monomers, in which a part or all of the protective group that can be regenerated to the anionic group is regenerated to the anionic group.

In addition, (meth)acrylic acid used as the polymer block $A^3$ represents generic name of acrylic acid and methacrylic acid, and (meth)acrylate represents generic name of acrylate and methacrylate.

Specific examples of (meth)acrylic acid and (meth)acrylate include polyalkylene oxide group-containing (meth)acrylate such as (meth)acrylic acid, methyl (meth)acrylate, ethyl (meth)acrylate, iso-propyl (meth)acrylate, allyl (meth)acrylate, (meth)acrylic acid n-butyl, (meth)acrylic acid iso-butyl, (meth)acrylic acid sec-butyl, (meth)acrylic acid tert-butyl, (meth)acrylic acid n-amyl, (meth)acrylic acid iso-amyl, (meth)acrylic acid n-hexyl, (meth)acrylic acid n-octyl, (meth)acrylic acid 2-ethyl hexyl, (meth)acrylic acid n-lauryl, (meth)acrylic acid n-tridecyl, (meth)acrylic acid n-stearyl, phenyl (meth)acrylate, benzyl (meth)acrylate, cyclohexyl (meth)acrylate, (meth)acrylic acid 4-tert-butyl cyclohexyl, (meth)acrylic acid isobornyl, (meth)acrylic acid tricyclodecanyl, (meth)acrylic acid dicyclopentadienyl, (meth)acrylic acid adamantyl, (meth)acrylic acid glycidyl, (meth)acrylic acid tetrahydrofurfuryl, (meth)acrylic acid 2-methoxyethyl, (meth)acrylic acid 2-ethoxyethyl, (meth)acrylic acid dimethyl aminoethyl, diethyl aminoethyl (meth)acrylate, trifluoroethyl (meth)acrylate, tetrafluoropropyl (meth)acrylate, pentafluoropropyl (meth)acrylate, octafluoropentyl (meth)acrylate, (meth)acrylate pentadecafluorooctyl, (meth)acrylate heptadecafluorodecyl, N,N-dimethyl (meth)acrylamide, (meth)acryloyl morpholine, (meth)acrylonitrile, polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, methoxy polyethylene glycol (meth)acrylate, ethoxy polyethylene glycol (meth)acrylate, butoxy polyethylene glycol (meth)acrylate, octoxy polyethylene glycol (meth)acrylate, lauroxy polyethylene glycol (meth)acrylate, stearoxy polyethylene glycol (meth)acrylate, phenoxy polyethylene glycol (meth)acrylate, methoxy polypropylene glycol (meth)acrylate, and octoxy polyethylene glycol-polypropylene glycol (meth)acrylate. These monomers can be used alone or two or more kinds thereof can be used in combination.

In the living anion polymerization method, in a case where the monomer to be used is a monomer having a group having an active proton such as an anionic group, since the active terminal of the living anion polymerization polymer immediately reacts with a group having these active protons and deactivates, a polymer cannot be obtained. In the living anionic polymerization, it is difficult to directly polymerize the monomer having a group having an active proton, and thus it is preferable to polymerize the group having an active proton in a state of being protected, and then regenerate the group having an active proton by deprotecting the protective group.

For these reasons, in the polymer block $A^3$, it is preferable to use a monomer containing (meth)acrylate having a protective group that can be regenerated to the anionic group by deprotection. By using the monomer, the above-described inhibition of the polymerization can be prevented during the polymerization. The anionic group protected by the protective group can be regenerated into an anionic group by deprotecting after obtaining a block polymer.

For example, in a case where the anionic group is a carboxyl group, the carboxyl group can be regenerated by esterifying the carboxyl group and deprotecting by hydrolysis or the like as a subsequent step. As a protective group which can be converted to a carboxyl group in this case, a group having an ester bond is preferable, and examples thereof include a primary alkoxy carbonyl group such as a methoxy carbonyl group, an ethoxy carbonyl group, an n-propoxy carbonyl group, and an n-butoxy carbonyl group; a secondary alkoxy carbonyl group such as an isopropoxy carbonyl group, an sec-butoxy carbonyl group; a tertiary alkoxy carbonyl group such as a t-butoxy carbonyl group; a phenyl alkoxy carbonyl group such as a benzyloxy carbonyl group; and an alkoxy alkyl carbonyl group such as an ethoxy ethyl carbonyl group.

In a case where the anionic group is a carboxyl group, examples of monomers that can be used include methyl (meth)acrylate, ethyl (meth)acrylate, n-propyl (meth)acrylate, isopropyl (meth)acrylate, and n-butyl (meth)acrylate, sec-butyl (meth)acrylate, isobutyl (meth)acrylate, t-butyl (meth)acrylate, 2-ethyl hexyl (meth)acrylate, and decyl (meth)acrylate, undecyl (meth)acrylate, dodecyl (meth)acrylate (lauryl (meth)acrylate), tridecyl (meth)acrylate, and pentadecyl (meth)acrylate, alkyl (meth)acrylate such as hexadecyl (meth)acrylate, heptadecyl (meth)acrylate, octadecyl (meth)acrylate (stearyl (meth)acrylate), nonadecyl (meth)acrylate, and icosanyl (meth)acrylate; phenyl alkylene (meth)acrylate such as benzyl (meth)acrylate; and alkoxy alkyl (meth)acrylate such as ethoxy ethyl (meth)acrylate. These (meth)acrylates can be used alone or two or more kinds thereof can be used in combination. Also, among these (meth)acrylates, the use of t-butyl (meth)acrylate or benzyl (meth)acrylate is preferable from the viewpoint of easy conversion reaction to a carboxyl group. Also, t-butyl (meth)acrylate is more preferable in consideration of industrial availability.

In General Formula (3), B represents an aromatic group or an alkyl group having 1 to 10 carbon atoms, n represents an integer of 1 to 5.

In the living anion polymerization method, in a case of directly polymerizing a (meth)acrylate monomer to the active terminal of a strongly nucleophilic styrenic polymer, nucleophilic attack on the carbonyl carbon may prevent polymerization. For this reason, when the (meth)acrylate monomer is polymerized to $A^1$-$A^2$, a reaction control agent is used to adjust the nucleophilicity, and then the (meth)acrylate monomer is polymerized. In General Formula (3), B is a group derived from the reaction control agent. Specific examples of the reaction control agent include diphenyl ethylene, α-methyl styrene, and p-methyl-α-methyl styrene.

The living anion polymerization method can be carried out by a batch method as used in conventional free radical polymerization by adjusting reaction conditions, and a method of continuous polymerization by a microreactor can also be mentioned as an example thereof. Since the microreactor has an excellent mixing property between the polymerization initiator and the monomer, the reaction starts at the same time, the temperature is uniform, and the polymerization rate can be made uniform, so that molecular weight distribution of the polymer to be prepared can be narrowed. At the same time, since a growth terminal is stable, it becomes easy to prepare a block copolymer in which both components of the block are not mixed. In addition, since the controllability of the reaction temperature is excellent, it is easy to suppress side reactions.

A general method of living anionic polymerization using the microreactor will be described with reference to FIG. 1, which is a schematic view of the microreactor.

A first monomer and a polymerization initiator for initiating polymerization are introduced into a T-shaped micro mixer M1 (1 in FIG. 1) having a flow path capable of mixing a plurality of liquids from tube reactors P1 and P2 (7 and 8 in FIG. 1) respectively, and in the T-shaped micro mixer M1, the first monomer is subjected to living anion polymerization to form a first polymer (step 1).

Next, the obtained first polymer is transferred to a T-shaped micro mixer M2 (2 in FIG. 1), and in the mixer M2, the growth terminal of the obtained polymer is trapped by the reaction control agent introduced from a tube reactor P3 (9 in FIG. 1) to carry out reaction adjustment (step 2). At this time, it is possible to control the number of n in General Formula (3) according to the type and amount of use of the reaction control agent.

Next, the first polymer subjected to reaction adjustment in the T-shaped micro mixer M2 is transferred to a T-shaped micro mixer M3 (3 in FIG. 1), and in the mixer M3, the living anionic polymerization is continuously performed on the second monomer introduced from a tube reactor P4 and the first polymer subjected to the reaction adjustment (step 3).

Thereafter, the reaction is quenched with a compound having an active proton such as methanol so as to prepare a block copolymer.

In a case where the polymer (G) represented by General Formula (3) of the present invention is prepared by the microreactor, a polymer block of a monomer having an aromatic ring or a heterocyclic ring of $A^2$ (an organic group which is an organic lithium initiator residue of $A^1$ is bonded to one terminal of the polymer block $A^2$) is obtained by using a monomer having an aromatic ring or a heterocyclic ring as the first monomer to react with an organic lithium initiator as an initiator. Next, after adjusting the reactivity of the growth terminal using the reaction control agent, a monomer containing a (meth)acrylate having a protective group that can be regenerated as an anionic group is reacted as the second monomer so as to obtain a polymer block.

After that, by regenerating to the anionic group by a deprotection reaction such as hydrolysis, a polymer block having the A3, that is, an anionic group can be obtained.

The method of regenerating the ester bond of the protective group that can be regenerated to the anionic group to an anionic group by a deprotection reaction such as hydrolysis will be described in detail.

The hydrolysis reaction of the ester bond proceeds under both acidic and basic conditions, but the conditions differ slightly depending on the group having the ester bond. For example, in a case where the group having an ester bond is a primary alkoxy carbonyl group such as methoxycarbonyl group or a secondary alkoxy carbonyl group such as isopropoxy carbonyl group, a carboxyl group can be obtained by hydrolysis under the basic conditions. At this time, examples of the basic compound under the basic conditions include a metal hydroxide such as a sodium hydroxide and a potassium hydroxide.

In addition, in a case where the group having an ester bond is a tertiary alkoxy carbonyl group such as t-butoxy carbonyl group, a carboxyl group can be obtained by hydrolysis under the acidic conditions. At this time, examples of the acidic compound under the acidic conditions include mineral acids such as hydrochloric acid, sulfuric acid, and phosphoric acid; breasted acids such as trifluoroacetic acid; and Lewis acids such as trimethylsilyl triflate. The reaction conditions for the hydrolysis under the acidic conditions of t-butoxy carbonyl group are disclosed, for example, in "The Chemical Society of Japan, 5th Edition, Experimental Chemistry Lecture 16, Synthesis of Organic Compounds IV".

Furthermore, as a method of converting the t-butoxy carbonyl group into a carboxyl group, a method using a cation exchange resin in place of the above acid can be exemplified. Examples of the cation exchange resin include a resin having an acid group such as a carboxyl group (—COOH) or a sulfo group (—SO$_3$H) at a side chain of a polymer chain. Among them, a cation exchange resin exhibiting a strong acidity having a sulfo group at the side chain of the resin is preferable because it can accelerate the reaction. As a commercial product of the cation exchange resin which can be used by present invention, for example, a strong acid cation exchange resin "Amberlite" prepared by Organo Corporation can be exemplified. For effective hydrolysis, the cation exchange resin is preferably used in an amount in the range of 5 parts by mass to 200 parts by mass, more preferably in the range of 10 parts by mass to 100 parts by mass, with respect to 100 parts by mass of the polymer represented by General Formula (3).

In addition, in a case where the group having an ester bond is a phenyl alkoxy carbonyl group such as a benzyloxy carbonyl group, it can be converted to a carboxyl group by carrying out a hydrogenation reduction reaction. At this time, under the reaction conditions, for example, under the presence of a palladium catalyst such as palladium acetate at room temperature, by reacting with hydrogen gas as a reducing agent, the phenyl alkoxy carbonyl group can be quantitatively regenerated to a carboxyl group.

As described above, the reaction conditions for conversion into a carboxyl group are differentiated depending on the type of group having an ester bond, and thus, for example, a polymer obtained by copolymerizing t-butyl (meth)acrylate and n-butyl (meth)acrylate as raw materials of $A^3$ has a t-butoxy carbonyl group and an n-butoxy carbonyl group. Here, since the n-butoxy carbonyl group does not hydrolyze under the acidic conditions under which the t-butoxy carbonyl group is hydrolyzed, only t-butoxy carbonyl group can be selectively hydrolyzed to allow deprotection to a carboxyl group. Therefore, adjustment of the acid value of a hydrophilic block ($A^3$) is attained by selecting suitably the monomer containing (meth)acrylate which has a protective group that can be regenerated to the anionic group which is a raw material monomer of $A^3$.

In the polymer (G) represented by General Formula (3), in order to improve the stability of an aqueous pigment dispersion in which the pigment is dispersed in water by the polymer (G), it is advantageous to select not a random copolymer in which the polymer block ($A^2$) and the polymer block ($A^3$) are randomly arranged and bonded, but a block copolymer in which the polymer blocks are regularly bonded as a unit of a certain length. The aqueous pigment dispersion is a raw material used for preparing an ink, and is a liquid in which the pigment is dispersed in water at a high concentration using the polymer (G). The molar ratio $A^2:A^3$ of the polymer block ($A^2$) to the polymer block ($A^3$) is preferably in the range of 100:10 to 100:500, and $A^2:A^3$ is more preferably 100:10 to 100:450, from the viewpoint of obtaining an ink capable of maintaining excellent discharge stability required when discharging the ink by an ink jet method, and capable of producing a print having more excellent color developability and the like.

In the polymer (G) represented by General Formula (3), the number of monomers having an aromatic ring or a heterocyclic ring constituting the polymer block ($A^2$) is preferably in the range of 5 to 40, is more preferably in the range of 6 to 30, and is most preferably in the range of 7 to 25. In addition, the number of anionic groups constituting the polymer block ($A^3$) is preferably in the range of 3 to 20, is more preferably in the range of 4 to 17, and is most preferably in the range of 5 to 15.

In a case where a molar ratio of $A^2:A^3$ of the polymer block ($A^2$) to the polymer block ($A^3$) is represented by a molar ratio of the number of moles having an aromatic ring or a heterocyclic ring constituting the polymer block ($A^2$) to the number of moles of an anionic group constituting the polymer block (A3) is preferably 100:7.5 to 100:400.

The acid value of the polymer (G) represented by General Formula (3) is preferably 40 mg KOH/g to 400 mg KOH/g, is more preferably 40 mg KOH/g to 300 mg KOH/g, and is still more preferably 40 mg KOH/g to 190 mg KOH/g, from the viewpoint of obtaining an ink capable of maintaining excellent discharge stability required when discharging the ink by an ink jet method, and capable of producing a print having more excellent scratch resistance.

In addition, the acid value of the polymer in present invention was set as the acid value obtained by the acid value measuring method similar to the measuring method of the fine particles of the polymer (G).

In the ink of the present invention, the anionic group of the polymer (G) is preferably neutralized.

As a basic compound which neutralizes the anionic group of the polymer (G), any of known and conventional ones can be used, for example, inorganic basic substances such as alkali metal hydroxides such as sodium hydroxide and potassium hydroxide, and organic basic compounds such as ammonia, triethylamine and alkanolamine can be used.

The amount of neutralization of the polymer (G) present in the aqueous pigment dispersion does not have to be 100% neutralized with respect to the acid value of the polymer. Specifically, the polymer (G) is preferably neutralized so as to have a neutralization rate of 20% to 200%, and 80% to 150% is more preferable.

As the ink of the present invention, in addition to the above components, other components such as a surfactant (E), a wetting agent (drying inhibitor), a penetrant, a preservative, a viscosity modifier, a pH adjuster, a chelating agent, a plasticizer, an antioxidant, and a UV absorber can be used as necessary.

The surfactant (E) can be used to improve the leveling properties of the ink by, for example, reducing the surface tension of the ink. Further, the surfactant (E) can prevent the occurrence of the streaks of the print by causing the ink-discharged from the discharge port of the ink jet head to wet and spread well on the surface after landing on the recording medium.

As the surfactant (E), various anionic surfactants, nonionic surfactants, cationic surfactants, amphoteric surfactants, and the like can be used, and anionic surfactants and nonionic surfactants are preferably used.

As the anionic surfactant, for example, alkyl benzene sulfonate, alkyl phenyl sulfonate, alkyl naphthalene sulfonate, higher fatty acid salt, sulfate esters of higher fatty acid ester, sulfonate of higher fatty acid esters, sulfates and sulfonates of higher alcohol ethers, higher alkyl sulfosuccinates, polyoxyethylene alkyl ether carboxylate, polyoxyethylene alkyl ether sulfate, alkyl phosphate, and polyoxyethylene alkyl ether phosphate can be used, and specific examples thereof include dodecyl benzene sulfonate, isopropyl naphthalene sulfonate, monobutyl phenyl phenol monosulfonate, monobutyl biphenyl sulfonate, and dibutyl phenyl phenol disulfonate.

As the nonionic surfactant, for example, polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, fatty acid alkylol amide, alkyl alkanolamide, acetylene glycol, an oxyethylene adduct of acetylene glycol, and a polyethylene glycol polypropylene glycol block copolymer can be used, and among them, polyoxyethylene nonylphenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, an oxyethylene adduct of acetylene glycol, and a polyethylene glycol polypropylene glycol block copolymers are preferable. Among them, acetylene glycol and an oxyethylene adduct of acetylene glycol are more preferable from the viewpoint of reducing a contact angle of the ink droplet to the recording medium so as to obtain an excellent print.

As other surfactants, a silicone surfactant such as a polysiloxane oxyethylene adduct; a fluoro surfactant such as perfluoroalkyl carboxylates, perfluoroalkyl sulfonates, and oxyethylene perfluoroalkyl ether; and a biosurfactant such as spicolisporic acid, rhamnolipid, and lysolecithin can also be used.

As the surfactant (E), those having an HLB in the range of 4 to 20 are preferably used in order to stably maintain a state in which the surfactant (E) is dissolved in an ink containing water as a main solvent.

The surfactant (E) is preferably used in the range of 0.001% by mass to 2% by mass, and is more preferably used in the range of 0.001% by mass to 1.5% by mass, and is still more preferably used in the range of 0.5% by mass to 1.5% by mass, with respect to the total amount of the ink. The inkjet ink containing the surfactant (E) in the above range is preferable from the viewpoint of that it is excellent in the wettability of the discharge droplet on the surface of the recording medium, has sufficient wetting and spreading on the recording medium to achieve the effect of preventing the occurrence of streaks on the print. Further, the ink containing the surfactant (E) in the above range exhibits the effect of improving the leveling property of a coated film.

Moreover, as a wetting agent which can be used for the ink, it can be used for the purpose of preventing the ink from being dried. The wetting agent is preferably used in the range of 3% by mass to 50% by mass with respect to the total amount of the ink.

As the wetting agent, it is preferable to use those which are miscible with water and capable of obtaining an effect of preventing the clogging of the discharge port of the ink jet head, and for examples thereof include ethylene glycol, diethylene glycol, triethylene glycol, polyethylene glycol having a molecular weight of 2000 or less, dipropylene glycol, tripropylene glycol, isopropylene glycol, isobutylene glycol, 1,4-butanediol, 1,3-butanediol, 1,5-pentanediol, 1,6-hexanediol, mesoerythritol, and pentaerythritol.

Examples of the penetrants that can be used for the above-described optional components include lower alcohols such as ethanol and isopropyl alcohol, an ethylene oxide adduct of alkyl alcohols such as ethylene glycol hexyl ether and diethylene glycol butyl ether, and a propylene oxide adduct of alkyl alcohols such as propylene glycol propyl ether. The content of the penetrant is preferably 3% by mass or less, and is more preferably 1% by mass or less with respect to the total amount of the ink. It is still more preferable not to contain substantially.

(Preparing Method of Ink)

The ink of the present invention can be prepared by mixing, for example, a binder resin (A), a compound (B) having a urea bond, an aqueous medium (C), a colorant (D), and if necessary, the above-described optional components such as a surfactant (E) and an organic solvent (F).

For the mixing, for example, a disperser such as a bead mill, an ultrasonic homogenizer, a high pressure homogenizer, a paint shaker, a ball mill, a roll mill, a sand mill, a sand grinder, a dyno mill, a disper mat, an SC mill, and a nanomizer can be used.

As the preparing method of the ink, more specifically, a method of preparing the ink by mixing collectively and stirring the binder resin (A), the compound (B) having a urea bond, the aqueous medium (C), the colorant (D) and, if necessary, optional components such as the surfactant (E) and the organic solvent (F).

In addition, examples of another preparing method of ink include a preparing method including <1> a step of producing a colorant dispersion a containing a colorant (D) at a high concentration by mixing a pigment dispersant such as the polymer (G), the colorant (D) such as the pigment, and a solvent as necessary, <2> a step of preparing a composition b by mixing the compound (B) having a urea bond and the solvent as necessary, <3> a step of preparing a composition c containing the binder resin (A), the aqueous medium (C), and the like, and <4> a step of mixing the colorant dispersion a, the composition b, and the composition c.

The ink obtained by the above method is preferably subjected to a centrifugal separation treatment or a filtration treatment, as necessary, in order to remove impurities mixed in the ink.

The pH of the ink of the present invention is preferably 7.0 or higher, is more preferably 7.5 or higher, and is still more preferably 8.0 or higher in order to improve the storage stability and the discharge stability of the ink to enhance the wetting and spreading, the print density, and the scratch resistance when printed on an ink non-absorbable or hardly absorbable recording medium. The upper limit of the pH of the ink is preferably 11.0 or lower, is more preferably 10.5 or lower, and is still more preferably 10.0 or lower in order to suppress the deterioration of members (for example, ink discharge port, ink flow path, and the like) constituting an ink application or discharge apparatus and reduce the influence in a case where the ink adheres to the skin.

(Recording Medium)

The ink of the present invention can be printed on a recording medium with excellent ink absorbability such as copy paper (PPC paper) generally used in a copying machine, a recording medium having an ink absorption layer, a non-absorbable recording medium having no ink absorbability, or a hardly absorbable recording medium with low water absorbability. In particular, it is possible to obtain a print which is excellent in the settability, the scratch resistance, and the water resistance even in a case where the ink of the present invention is printed on the ink non-absorbable or hardly absorbable recording medium.

As the hardly absorbable recording medium, a recording medium having a water absorption of 10 $g/m^2$ or less for a contact time of 100 ms between the recording medium and water is preferably used in combination with the ink of the present invention in order to obtain a print which is more excellent in the scratch resistance and the water resistance.

The water absorption may be measured under conditions of 23° C. and 50% relative humidity using an automatic scanning liquid absorption meter (KM 500 win, manufactured by KUMAGAI RIKI KOGYO Co., Ltd.), and the amount of transition of pure water for a contact time of 100 ms was measured to obtain a 100 ms water absorption. The measurement conditions are described below.

[Spiral Method]
  Contact Time: 0.010 to 1.0 (sec)
  Pitch: 7 (mm)
  Length per sampling: 86.29 (degree)
  Start Radius: 20 (mm)
  End Radius: 60 (mm)
  Min Contact Time: 10 (ms)
  Max Contact Time: 1000 (ms)
  Sampling Pattern: 50
  Number of sampling points: 19

[Square Head]
  Slit Span: 1 (mm)
  Width: 5 (mm)

Examples of the recording medium having the ink absorbability include plain paper, fabric, cardboard, and wood. Moreover, examples of the recording medium having the absorbing layer include ink jet dedicated paper, and specifically, Pictrico Pro photo paper produced by Pictorico.

In the hardly absorbable recording medium with low water absorbability, a cardboard provided with a colored layer that hardly absorbs the solvent in the ink on the surface, art paper such as printing paper, coated paper, lightweight coated paper, fine coated paper, and the like can be used. These hardly-absorbable recording media are those in which a coating layer is provided by applying a coating material on the surface of high-quality paper, neutral paper, and the like that are generally not surface-treated, mainly cellulose, and as examples thereof, it is possible to use plastic films such as fine coated paper such as "OK Ever Light Coat" produced by OJI PAPER CO., LTD. and "Aurora S" produced by Nippon Paper Industries Co., Ltd., lightweight coated paper (A3) such as "OK coat L" produced by OJI PAPER CO., LTD. and "Aurora L" produced by Nippon Paper Industries Co., Ltd., "OK top coat+(water absorption in the basis weight of 104.7 $g/m^2$ and contact time of 100 ms (hereinafter, the water absorption is the same as 4.9 $g/m^2$)" produced by OJI PAPER CO., LTD., coated paper (A2, B2) such as "Aurora Coat" produced by Nippon Paper Industries Co., Ltd., "Finess Gloss" (UPM-Kymmene Oyj, 115 $g/m^2$, water absorption of 3.1 $g/m^2$) and Finess Matt (115 $g/m^2$, water absorption of 4.4 $g/m^2$)" produced by UPM-Kymmene Oyj, and art paper (A1) such as "OK Kinfuji+" produced by OJI PAPER CO., LTD. and "Tokuhishi Art" produced by MITSUBISHI PAPER MILLS LIMITED. Examples of the plastic film include a polyester film made of polyethylene terephthalate, polyethylene naphthalate, or the like, a polyolefin film made of polyethylene, polypropylene, or the like, a polyamide film made of nylon or the like, a polystyrene film, a polyvinyl alcohol film, a polyvinyl chloride film, a polycarbonate film, a polyacrylonitrile film, and a polylactic acid film. As the plastic film, it is preferable to use a polyester film, a polyolefin film, a polyamide film, and it is preferable to use a polyethylene terephthalate film, a polypropylene film, and a nylon film.

As the plastic film, a film coated with polyvinylidene chloride or the like for imparting a barrier property, or a film having a metal layer such as aluminum or a vapor deposited layer made of a metal oxide such as silica or alumina.

The plastic film may be an unstretched film, or may be a uniaxially or biaxially stretched film. Further, the surface of the film may be untreated, but for improving the adhesion, the surface of the film is preferably subjected to various treatments such as a corona discharge treatment, an ozone treatment, a low temperature plasma treatment, a flame treatment, and a glow discharge treatment.

The film thickness of the plastic film may be appropriately changed depending on the application, and for example, in a case of soft packaging applications, the film thickness is preferably 10 µm to 100 µm, as it has flexibility, durability, and curl resistance. It is more preferably 10 µm to 30 µm. Specific examples thereof include PYLEN, and ESPET (all are registered trademarks) produced by Toyobo Co., Ltd.

Among the above-described recording media, the ink of the present invention can be suitably used for printing on a cardboard made of a paperboard that easily absorbs a solvent contained in the ink, and a cardboard provided with a colored layer that hardly absorbs the solvent in the ink on the surface of the paperboard.

As the above-described cardboard, for example, one in which a liner is bonded to one side or both sides of a core formed into a corrugated shape can be used, and a single-faced cardboard, a double-faced cardboard, a double-wall cardboard, and a triple-wall cardboard can be used.

Specifically, the above-described cardboard can be suitably used for printing as a cardboard made of a paperboard that easily absorbs a solvent contained in the ink, and a cardboard provided with a colored layer or a waterproof layer that hardly absorbs the solvent in the ink on the surface of the paperboard. Even in a case of using a non-absorbable or hardly absorbable recording medium such as a cardboard provided with a colored layer or a waterproof layer that hardly absorbs the solvent in the ink on the surface of the paper board, the ink of the present invention tends to wet and spread on the surface of the recording medium, and as a result, the occurrence of the streaks of the print can be effectively suppressed.

In addition, in a case of performing ink jet printing with respect to the cardboard with the ink of present invention, even when the distance from the surface (x) having the ink discharge port of the ink jet head to the position (y) where the line perpendicular to the surface (x) intersects with the recording medium is 2 mm or more, the ink is sufficiently wet and spread after landing on the recording medium, and thus the occurrence of the streaks of the print can be effectively prevented.

Among the cardboards, as the cardboard provided with a colored layer or a waterproof layer on the surface, it is possible to use those in which the coloring agent or the waterproofing agent is applied by, for example, a curtain coating method and a roll coating method, on the surface of a cardboard made of the paperboard to form a coating film.

Examples of the colored layer include those having a whiteness of 70% or higher.

In the layer such as the colored layer or the waterproof layer of the cardboard, the water absorption of the recording medium is preferably 10 g/m² or less for a contact time of 100 ms between the recording surface of the recording medium and water, which is preferable in achieving the waterproof effect of the print.

EXAMPLES

Hereinafter, the present invention will be described in more detail by way of examples.
(Method for Preparing Polymer (P-1))

Synthetic Example 1

A hexane solution of BuLi and a styrene solution in which styrene was previously dissolved in tetrahydrofuran were introduced into a T-shaped micro mixer M1 from tube reactors P1 and P2 as illustrated in FIG. 1, and were subjected to anionic living polymerization to obtain a polymer.

Next, the polymer obtained in the above step is transferred to a T-shaped micro mixer M2 through the tube reactor R1 illustrated in FIG. 1, and the growth terminal of the polymer was trapped by a reaction control agent (α-methyl styrene (α-MeSt)) introduced from a tube reactor P3.

Then, a tert-butyl methacrylate solution prepared by previously dissolving tert-butyl methacrylate in tetrahydrofuran is introduced into the T-shaped micro mixer M3 from a tube reactor P4 illustrated in FIG. 1, and a continuous living anionic polymerization reaction was performed with the trapped polymer transferred through the tube reactor R2. Thereafter, a block copolymer (PA-1) composition was prepared by quenching the living anionic polymerization reaction by supplying methanol.

When the block copolymer (PA-1) composition was produced, the reaction temperature was set at 24° C. by immersing the entire microreactor illustrated in FIG. 1 in a constant temperature bath.

The molar ratio of the monomers constituting the block copolymer (PA-1) obtained by the above method was (BuLi/styrene/α-methyl styrene/tert-butyl methacrylate)=1.0/12.0/1.3/8.1.

The obtained block copolymer (PA-1) composition was hydrolyzed by a treatment with a cation exchange resin, and then distilled off under reduced pressure, and a solid thus obtained was pulverized to obtain a powdery polymer (P-1).
(Method for Preparing Polymer (P-2))

Synthetic Example 2

100 parts by mass of methyl ethyl ketone was charged into a reaction container having a stirrer, a dropping device, and a refluxing device, and the inside of the reaction container was purged with nitrogen while being stirred. After the inside of the reaction container was kept in a nitrogen atmosphere and heated to reflux methyl ethyl ketone, a mixture solution of 74 parts by mass of styrene, 11 parts by mass of acrylic acid, 15 parts by mass of methacrylic acid, and 8 parts by mass of a polymerization initiator (Wako Pure Chemical Industries, Ltd./"V-75") was added dropwise over 2 hours into the reaction container from the dropping device. Note that, the temperature of the reaction system was kept at 60° C. during the dropwise addition.

After completion of the dropwise addition, the reaction was continued at 80° C. for another 25 hours. During the reaction, a polymerization initiator was added as needed while checking the consumption of the raw materials. After completion of the reaction, methyl ethyl ketone was distilled off under reduced pressure, and the obtained solid was pulverized to obtain a powdery polymer (P-2).

Physical properties of the obtained polymers (P-1) and (P-2) were measured as follows.

(Method of Measuring Number Average Molecular Weight (Mn))

The measurement was performed under the following conditions by gel permeation chromatography (GPC) method.

Measurement apparatus: high speed GPC apparatus ("HLC-8220GPC" manufactured by TOSOH CORPORATION)

Column: the following columns manufactured by TOSOH CORPORATION were used by being connected in series.

"TSKgel G 5000" (7.8 mm I.D.×30 cm)×1
"TSKgel G 4000" (7.8 mm I.D.×30 cm)×1
"TSKgel G 3000" (7.8 mm I.D.×30 cm)×1
"TSKgel G 2000" (7.8 mm I.D.×30 cm)×1
Detector: RI (differential refractometer)
Column temperature: 40° C.
Eluent: tetrahydrofuran
Flow rate: 1.0 mL/min
Injection volume: 100 μL (tetrahydrofuran solution having a sample concentration of 0.4% by mass)
Standard sample: a calibration curve was prepared using the following standard polystyrene.

(Standard Polystyrene)
"TSKgel standard polystyrene F-500" manufactured by TOSOH CORPORATION
"TSKgel standard polystyrene F-1000" manufactured by TOSOH CORPORATION
"TSKgel standard polystyrene F-2500" manufactured by TOSOH CORPORATION
"TSKgel standard polystyrene F-5000" manufactured by TOSOH CORPORATION
"TSKgel standard polystyrene F-1" manufactured by TOSOH CORPORATION
"TSKgel standard polystyrene F-2" manufactured by TOSOH CORPORATION
"TSKgel standard polystyrene F-4" manufactured by TOSOH CORPORATION
"TSKgel standard polystyrene F-10" manufactured by TOSOH CORPORATION
"TSKgel standard polystyrene F-20" manufactured by TOSOH CORPORATION
"TSKgel standard polystyrene F-40" manufactured by TOSOH CORPORATION
"TSKgel standard polystyrene F-80" manufactured by TOSOH CORPORATION
"TSKgel standard polystyrene F-128" manufactured by TOSOH CORPORATION
"TSKgel standard polystyrene F-288" manufactured by TOSOH CORPORATION
"TSKgel standard polystyrene F-550" manufactured by TOSOH CORPORATION (Method of Measuring Acid Value)

The measurement was performed according to JIS test method K 0070-1992. 0.5 g of sample is dissolved in tetrahydrofuran, and titrated with a 0.1 M potassium hydroxide alcohol solution using phenolphthalein as an indicator to obtain the acid value.

(Method of Measuring Water Solubility)

0.5 g of a polymer whose particle diameter is adjusted in the range of 250 μm to 90 μm using a sieve with openings of 250 μm and 90 μm was enclosed in a bag processed with a wire mesh having 400 mesh, immersed in 50 ml of water, and gently stirred and left at a temperature of 25° C. for 24 hours. After immersing for 24 hours, the wire mesh having 400 mesh enclosing the polymer was dried for 2 hours with a dryer set at 110° C. The change in weight before and after immersion in water of the wire mesh having 400 mesh enclosing the polymer was measured, and the solubility was calculated by the following equation.

$$\text{Solubility (g/100 ml)} = (\text{wire mesh (g) having 400 mesh enclosing polymer before immersing} - \text{wire mesh (g) having 400 mesh enclosing polymer after immersing}) \times 2 \quad \text{[Equation 3]}$$

(Method of Determining Formation of Fine Particles in Water and Method of Measuring Average Particle Diameter (nm))

(1) The acid value of the polymer is obtained according to the method for measuring the acid value.

(2) After adding 1 g of the polymer (G) to 50 ml of water, 0.1 mol/L of potassium hydroxide aqueous solution enough to neutralize the obtained acid value of the polymer obtained in (1) above by 100% is added to make 100% neutralized solution.

(3) The 100% neutralized solution was irradiated with ultrasonic waves and dispersed in an ultrasonic cleaner (ultrasonic cleaner US-102 manufactured by SND Corporation, 38 kHz self-oscillation) at a temperature of 25° C. for 2 hours and left for 24 hours at room temperature.

The liquid at a depth of 2 centimeters from the surface of the liquid obtained by leaving was used as a sample liquid to check the presence or absence of the formation of the fine particles from the light scattering information of the particles by using a dynamic light scattering particle size distribution measuring apparatus (dynamic light scattering particle diameter measuring apparatus, "Microtrac particle size distribution analyzer UPA-ST150", manufactured by Nikkiso Co., Ltd.) and when the fine particles were present, the volume average particle diameter thereof was measured.

(Method of Measuring Surface Tension)

The same sample solution as the sample solution obtained by the method of determining the formation of fine particles in water was set as a value measured using a Wilhelmy surface tension meter.

Tables 1 and 2 indicate the raw materials, reaction conditions, and physical properties of the polymer obtained in the synthesis example.

TABLE 1

| | | Synthetic example 1 |
|---|---|---|
| Polymer (X) | | P-1 |
| Reaction temperature | | 24° C. |
| Polymerization initiator | Kind | BuLi |
| | Mol | 1.0 |
| First monomer | Kind | St |
| | Mol | 12.0 |
| Reaction control agent | Kind | α-MeSt |
| | Mol | 2.0 |
| Second monomer | Kind | tBMA |
| | Mol | 8.1 |
| Mole ratio of polymer block (A2) consisting of first monomer to polymer block (A3) consisting of second monomer | A2:A3 = | 100:76 |
| Number average molecular weight | | 2471 |
| Acid vale | mgKOH/g | 148 |
| Solubility in water (g/100 ml) | | 0.0056 |
| Presence/absence of fine particles at 100% neutralization rate/average particle size (nm) | | Presence/48 |
| Surface tension (dyn/cm) | | 67.7 |

TABLE 2

|  | Synthetic example 2 |
| --- | --- |
| Polymer (X) | P-2 |
| Number average molecular weight | 5255 |
| Acid vale  mgKOH/g | 185 |
| Solubility in water(g/100 ml) | 0.031 |
| Presence/absence of fine particles at 100% neutralization rate/average particle size (nm) | Absence |
| Surface tension (dyn/cm) | 45.0 |

In Tables 1 and 2, BuLi represents normal butyl lithium, St represents styrene, DPE represents 1,1-diphenylethylene, and α-MeSt represents α-methyl styrene.

tBMA represents tert-butyl methacrylate.

Preparation Example 1

Method of Preparing Aqueous Pigment Dispersion (C-1))

150 parts by mass of phthalocyanine pigment Fast Gen Blue Pigment (prepared by DIC Corporation: C.I. Pigment 15:3) as a pigment, 45 parts by mass of the polymer (P-1), 150 parts by mass of triethylene glycol, and 20 parts by mass of a 34% by mass potassium hydroxide aqueous solution were charged in 1.0 L of intensive mixer (manufactured by Nippon Eirich Co., Ltd.), and the mixture was kneaded for 25 minutes at a rotor circumferential speed of 2.94 m/s and a pan circumferential speed of 1 m/s.

Next, while continuing the stirring of the kneaded material in the intensive mixer container, 450 parts by mass of ion exchange water as the dispersion medium (i) was gradually added, then 185 parts by mass of ion exchange water as the dispersion medium (ii) was further added in the container and the mixture was added so as to obtain an aqueous pigment dispersion (C-1) having 15% by mass of pigment concentration.

Preparation Examples 2, 3, and 5 to 8

Method of Preparing Aqueous Pigment Dispersion

As raw materials and the mixing ratio, the raw materials and the mixing ratios indicated in Table 3 and Table 4 were employed, and the preparing method was the same method as in Preparation Example 1 to obtain an aqueous pigment dispersion.

Preparation Example 4

Method of Preparing of Aqueous Pigment Dispersion (C-2))

120 parts by mass of phthalocyanine pigment Fast Gen Blue Pigment (prepared by DIC Corporation: C.I. Pigment 15:3) as a pigment and 36 parts by mass of the polymer (P-3) were charged to a 0.2 L normal pressure kneader (manufactured by Advance Co., Ltd.), and mixed at a jacket temperature of 80° C. (feather rotation speed: 40 rpm). Next, 52 parts by mass of diethylene glycol and 20 parts by mass of a 34% by mass aqueous potassium hydroxide solution were added and kneaded for one hour.

Next, while continuing the stirring of the kneaded material in a normal pressure kneader, 360 parts by mass of ion exchange water as the dispersion medium (i) was gradually added, then 68 parts by mass of diethylene glycol as the dispersion medium (ii) and 144 parts by mass of ion exchange water as the dispersion medium were further added in the container and the mixture was added so as to obtain an aqueous pigment dispersion (C-2) having 15% by mass of pigment concentration.

TABLE 3

|  | Preparation Example 1 | Preparation Example 2 | Preparation Example 3 | Preparation Example 4 |
| --- | --- | --- | --- | --- |
| Aqueous pigment dispersion | C-1 | K-1 | K-2 | C-2 |
| Pigment | PB15:3 | PB7 | PB7 | PB15:3 |
| Pigment (parts by mass) | 150 | 150 | 150 | 120 |
| Polymer (X) | P-1 | P-1 | P-1 | P-2 |
| Polymer (X) (parts by mass) | 45 | 45 | 45 | 36 |
| Polymer (X) Acid vale | 148 | 148 | 148 | 185 |
| [Polymer (X)/Pigment] (mass ratio) | 0.3 | 0.3 | 0.3 | 0.3 |
| Water soluble organic solvent | TEG | TEG | TEG |  |
| Water soluble organic solvent (parts by mass) | 150 | 135 | 99 | 52 |
| 34% by mass potassium hydroxide aqueous solution (parts by mass) | 20 | 20 | 20 | 28 |
| Dispersion medium (i) (parts by mass) | Water = 450 | Water = 450 | Water = 450 | Water = 360 |
| Dispersion medium (ii) (parts by mass) | TEG:Water = 0/185 | TEG:Water = 0/140 | TEG:Water = 0/110 | DEG:Water = 68/144 |
| Volume average particle diameter (nm) | 110.5 | 69.4 | 74.3 | 106 |
| Number of coarse particles having volume average particle diameter of 1.0 μm or more (×10$^6$ number/ml) | 28 | 6 | 7 | 90 |

TABLE 4

|  | Preparation Example 5 | Preparation Example 6 | Preparation Example 7 | Preparation Example 8 |
|---|---|---|---|---|
| Aqueous pigment dispersion | C-3 | M-1 | Y-1 | Y-2 |
| Pigment | PB15:3 | PR122 | PY74 | PY74 |
| Pigment (parts by mass) | 150 | 150 | 150 | 150 |
| Polymer (X) | P-1 | P-1 | P-1 | P-1 |
| Polymer (X) (parts by mass) | 30 | 30 | 45 | 30 |
| Polymer (X) Acid vale | 148 | 148 | 148 | 148 |
| [Polymer (X)/Pigment] (mass ratio) | 0.2 | 0.2 | 0.3 | 0.2 |
| Water soluble organic solvent | TEG | TEG | TEG | TEG |
| Water soluble organic solvent (parts by mass) | 150 | 150 | 150 | 150 |
| 34% by mass potassium hydroxide aqueous solution (parts by mass) | 20 | 20 | 20 | 20 |
| Dispersion medium (i) (parts by mass) | Water = 450 | Water = 458 | Water = 450 | Water = 450 |
| Dispersion medium (ii) (parts by mass) | TEG:Water = 0/185 | TEG:Water = 0/185 | TEG:Water = 0/185 | TEG:Water = 0/185 |
| Volume average particle diameter (nm) | 101.2 | 113.5 | 94.7 | 94.1 |
| Number of coarse particles having volume average particle diameter of 1.0 μm or more (×10$^6$ number/ml) | 1 | 4 | 22 | 3 |

In Tables 3 and 4, PB15:3 represents a phthalocyanine pigment Fast Gen Blue Pigment, PB7 represents a Pigment Black 7, PR122 represents a Pigment Red 122, PY 74 represents a Pigment Yellow 74, DEG represents a diethylene glycol, TEG represents triethylene glycol, and water represents ion exchange water.

(Method of Preparing Binder Resin)

Synthetic Example 3

16 g of "Nyukol 707SF" (anionic emulsifier prepared by Nippon Emulsifier Co., Ltd.), 6.5 g of "Neugen TDS-200D" (nonionic emulsifier prepared by Daiichi Kogyo Seiyaku Co., Ltd.), and 220 g deionized water were charged in a four-necked flask equipped with a stirrer, a thermometer, a condenser, and a nitrogen inlet, the temperature was raised to 80° C. in the nitrogen stream, and then an aqueous solution in which 0.8 g of ammonium persulfate was dissolved in 16 g of deionized water was added. Further, a mixed solution of 60 g of 2-ethyl hexyl acrylate, 100 g of styrene, 27 g of methyl methacrylate, 3 g of acrylamide, and 6 g of methacrylic acid was added dropwise over 3 hours. After completion of the dropwise addition, the reaction was carried out for 2 hours, then the mixture was cooled to 25° C., neutralized with 1.5 g of 28% by mass ammonia water, and added with deionized water, to obtain an acrylic resin water dispersion (X-1) having a glass transition temperature (Tg) of 35° C. and an average particle diameter of 50 nm. The final solid content concentration of the acrylic resin dispersion (X-1) was 39% by mass.

(Preparation of Aqueous Ink)

Preparation Example 1

Method of Preparing Aqueous Ink 6.0 g of MB (3-methoxy-1-butanol prepared by Daicel Corporation), 8.0 g of propylene glycol, 9.0 g of glycerin, 0.47 g of triethylene glycol, 2.0 g of SC-P1000 (polyoxypropylene (14) polyglycer ether prepared by Sakamoto Yakuhin Kogyo Co., Ltd.), 5.62 g of ethylene urea, 0.2 g of triethanolamine, 1.6 g of SURFYNOL 104 PG 50 (acetylene dialcohol surfactant prepared by Air Products and Chemicals, Inc.), 0.012 g of TEGO Wet KL 245 (polyether-modified siloxane copolymer prepared by TOMOE Engineering Co., Ltd.), ACTICIDE B-20 (preservative prepared by THOR JAPAN), 13.61 g of BONCOAT CM-8430 aqueous solution (acrylic resin prepared by DIC Corporation), and 15.49 g of deionized water were added to 37.9 g of aqueous pigment dispersion (K-1), and the mixture was stirred to obtain an aqueous ink (J1).

Preparation Examples 2 to 8

Method of Preparing Aqueous Ink

Aqueous inks (J2) to (J14) were obtained in the same manner as in Preparation Example 1 except that the kinds of the aqueous pigment dispersions and the ink composition were changed as indicated in Tables 5 to 8.

Comparative Preparation Examples 1 and 2

Method of Preparing Aqueous Ink

Aqueous inks (H1) to (H2) were obtained in the same method as in Preparation Example 1 except that the composition of the ink was changed to the composition indicated in Table 9.

TABLE 5

| Ink | | Example 1 J1 | Example 2 J2 | Example 3 J3 | Example 4 J4 |
|---|---|---|---|---|---|
| Aqueous pigment dispersion | K-1 (g) | 37.9 | | | |
| | C-1 (g) | | 43.2 | | |
| | M-1 (g) | | | 46.0 | |
| | Y-1 (g) | | | | 41.3 |
| | K-2 (g) | | | | |
| | C-2 (g) | | | | |
| | C-3 (g) | | | | |
| | Y-2 (g) | | | | |
| Organic solvent | 3MB (g) | 6.0 | 4.0 | 1.0 | 1.0 |
| | PG (g) | 8.0 | 16.0 | 9.2 | 16.0 |
| | GLY (g) | 9.0 | 9.0 | 8.0 | 4.0 |
| | TEG (g) | 0.5 | 0.1 | 0.9 | 0.9 |
| | SC-P1000 (g) | 2.0 | | | |
| Compound having urea bond | Ethylene urea (g) | 5.6 | 5.6 | 5.6 | 5.6 |
| Additives | TEA (g) | 0.2 | 0.2 | | 0.2 |
| | SF104PG (g) | 1.6 | 1.3 | 1.7 | 1.5 |
| | KL-245 (g) | 0.0 | 0.0 | 0.0 | 0.0 |
| | B-20 (g) | 0.1 | 0.1 | 0.1 | 0.1 |
| Binder resin | CM-8430 (g) | 13.6 | 13.6 | 11.1 | 11.1 |
| Ion exchange water (g) | | 15.5 | 6.9 | 16.1 | 18.2 |
| Total (g) | | 100.0 | 100.0 | 100.0 | 100.0 |

TABLE 6

| Ink | | Example 5 J5 | Example 6 J6 | Example 7 J7 | Example 8 J8 |
|---|---|---|---|---|---|
| Aqueous pigment dispersion | K-1 (g) | 37.9 | | | |
| | C-1 (g) | | 43.2 | | |
| | M-1 (g) | | | 46.0 | |
| | Y-1 (g) | | | | 44.2 |
| | K-2 (g) | | | | |
| | C-2 (g) | | | | |
| | C-3 (g) | | | | |
| | Y-2 (g) | | | | |
| Organic solvent | 3MB (g) | 6.0 | 4.0 | 1.0 | 1.0 |
| | PG (g) | 3.0 | 12.0 | 8.5 | 16.0 |
| | GLY (g) | 9.0 | 9.0 | 8.0 | 4.0 |
| | TEG (g) | 0.5 | 0.6 | 0.9 | 0.4 |
| | SC-P1000 (g) | 2.0 | | | |
| Compound having urea bond | Ethylene urea (g) | 5.6 | 5.6 | 5.6 | 5.6 |
| Additives | TEA (g) | 0.2 | 0.2 | 0.2 | 0.2 |
| | SF104PG (g) | 2.2 | 2.0 | 2.4 | 2.3 |
| | KL-245 (g) | 0.0 | 0.0 | 0.0 | 0.0 |
| | B-20 (g) | 0.1 | 0.1 | 0.1 | 0.1 |
| Binder resin | CM-8430 (g) | 11.1 | 11.1 | 11.1 | 11.1 |
| Ion exchange water (g) | | 22.4 | 12.1 | 16.1 | 15.0 |
| Total (g) | | 100.0 | 100.0 | 100.0 | 100.0 |

TABLE 7

| Ink | | Example 9 J9 | Example 10 J10 | Example 11 J11 | Example 12 J12 |
|---|---|---|---|---|---|
| Aqueous pigment dispersion | K-1 (g) | 37.9 | 16.8 | | |
| | C-1 (g) | | | | |
| | M-1 (g) | | | | |
| | Y-1 (g) | | | | |
| | K-2 (g) | | | 37.9 | |
| | C-2 (g) | | | | 43.2 |

TABLE 7-continued

| Ink | | Example 9 J9 | Example 10 J10 | Example 11 J11 | Example 12 J12 |
|---|---|---|---|---|---|
| | C-3 (q) | | | | |
| | Y-2 (g) | | | | |
| Organic solvent | 3MB (g) | 6.0 | 6.0 | 6.0 | 4.0 |
| | PG (g) | 3.0 | 3.0 | 3.0 | 12.0 |
| | GLY (g) | 9.0 | 9.0 | 9.0 | 9.0 |
| | TEG (g) | 0.5 | 0.5 | 0.5 | 0.6 |
| | SC-P1000 (g) | 2.0 | 2.0 | 2.0 | |
| Compound having urea bond | Ethylene urea (g) | 5.6 | 5.6 | 5.6 | 5.6 |
| Additives | TEA (g) | 0.2 | 0.2 | 0.2 | 0.2 |
| | SF104PG (g) | 2.2 | 2.2 | 2.2 | 2.0 |
| | KL-245 (g) | 0.0 | 0.0 | 0.0 | 0.0 |
| | B-20 (g) | 0.1 | 0.1 | 0.1 | 0.1 |
| Binder resin | CM-8430 (g) | 5.0 | 11.1 | 11.1 | 11.1 |
| Ion exchange water (g) | | 28.5 | 43.5 | 22.4 | 12.1 |
| Total (g) | | 100.0 | 100.0 | 100.0 | 100.0 |

TABLE 8

| Ink | | Example 13 J13 | Example 14 J14 |
|---|---|---|---|
| Aqueous pigment dispersion | K-1 (g) | | |
| | C-1 (g) | | |
| | M-1 (g) | | |
| | Y-1 (g) | | |
| | K-2 (g) | | |
| | C-2 (g) | | |
| | C-3 (g) | 43.2 | |
| | Y-2 (g) | | 44.2 |
| Organic solvent | 3MB (g) | 4.0 | 1.0 |
| | PG (g) | 12.0 | 16.0 |
| | GLY (g) | 9.0 | 4.0 |
| | TEG (g) | 0.6 | 0.4 |
| | SC-P1000 (g) | | |
| Compound having urea bond | Ethylene urea (g) | 5.6 | 5.6 |
| Additives | TEA (g) | 0.2 | 0.2 |
| | SF104PG (g) | 2.0 | 2.3 |
| | KL-245 (g) | 0.0 | 0.0 |
| | B-20 (g) | 0.1 | 0.1 |
| Binder resin | CM-8430 (g) | 11.1 | 11.1 |
| Ion exchange water (g) | | 12.1 | 12.1 |
| Total (g) | | 100.0 | 100.0 |

TABLE 9

| Ink | | Comparative Example 1 H1 | Comparative Example 2 H2 |
|---|---|---|---|
| Aqueous pigment dispersion | K-1 (g) | 37.9 | 37.9 |
| | C-1 (g) | | |
| | M-1 (g) | | |
| | Y-1 (g) | | |
| | K-2 (g) | | |
| | C-2 (g) | | |
| | C-3 (g) | | |
| | C-4 (g) | | |
| | Y-2 (g) | | |
| Organic solvent | 3MB (g) | 6.0 | 6.0 |
| | PG (g) | 3.0 | 15.0 |
| | GLY (g) | 9.0 | 9.0 |
| | TEG (g) | 0.5 | 0.5 |
| | SC-P1000 (g) | 2.0 | 2.0 |
| Compound having urea bond | Ethylene urea (g) | 5.6 | 5.6 |
| Additives | TEA (g) | 0.2 | 0.2 |
| | SF104PG (g) | | 2.2 |
| | KL-245 (g) | 0.0 | 0.0 |
| | B-20 (g) | 0.1 | 0.1 |
| Binder resin | CM-8430 (g) | 11.1 | 11.1 |
| Ion exchange water (g) | | 22.4 | 22.4 |
| Total (g) | | 100.0 | 100.0 |

In tables, the abbreviations are as follows.
3 MB: 3-methoxy-1-butanol
PG: Propylene glycol
GLY: Glycerin
TEG: Triethylene glycol
SC-P1000: polyoxypropylene (14) polyglycer ether
TEA: Triethanolamine
SF104PG: SURFYNOL 104PG50
KL245: TEGO Wet KL245
B-20: ACTICIDE B-20
CM-8430: BON COAT CM-8430 aqueous solution (Evaluation of Aqueous Ink)

The properties of the aqueous inks (J1) to (J14) and (H1) and (H2) were evaluated as follows. The results are indicated in Tables 10 to 14.

[Evaluation of Streaks on Print]

An ink jet head KJ4B-YH manufactured by Kyocera Corporation was filled with each of the aqueous inks obtained in examples and comparative examples, and a supply pressure was adjusted by setting a water head difference of an ink sub-tank from a head nozzle plate surface to be +35 cm and a negative pressure of −5.0 kPa. In addition, the distance (gap) from the surface (x) having the ink discharge port of the ink jet head to the position (y) where the line perpendicular to the surface (x) intersects with the recording medium was set to 2 to 4 mm. As a recording medium, a cardboard having a thickness of about 2 mm and having a white colored layer was used. The driving conditions of the head were standard voltage and temperature of the ink jet head, the droplet size was set to 18 pL, and 100% solid printing was performed to obtain a print.

The print was read by a scanner, and the ratio of the portions (streak rate) where ink was not applied was calculated by image analysis software "Image J".

A: Streak rate of print less than 3%
B: Streak rate of print 3% or more and less than 5%
C: Streak rate of print 5% or more and less than 10%
D: Streak rate of print 10% or more

[Evaluation of Wetting and Spreading]

An ink jet head KJ4B-YH manufactured by Kyocera Corporation was filled with each of the aqueous inks obtained in examples and comparative examples, and a supply pressure was adjusted by setting a water head difference of an ink sub-tank from a head nozzle plate surface to be +35 cm and a negative pressure of −5.0 kPa. In addition, the distance (gap) from the surface (x) having the ink discharge port of the ink jet head to the position (y) where the line perpendicular to the surface (x) intersects with the recording medium was set to 2 mm. As a recording medium, a cardboard having a thickness of about 2 mm and having a white colored layer was used. The driving conditions of the head were standard voltage and temperature of the inkjet head, the droplet size was set to 18 pL, and a nozzle check pattern of the head was printed.

The print was observed with a microscope, and the width of a line drawn using one nozzle was measured.

A: Line width is 80 μm or more
B: Line width is 75 μm or more and less than 80 μm
C: Line width is 70 μm or more and less than 75 μm
D: Line width is less than 70 μm

[Evaluation of Ink Concentration]

An ink jet head KJ4B-YH manufactured by Kyocera Corporation was filled with each of the aqueous inks obtained in examples and comparative examples, and a supply pressure was adjusted by setting a water head difference of an ink sub-tank from a head nozzle plate surface to be +35 cm and a negative pressure of −5.0 kPa. In addition, the distance (gap) from the surface (x) having the ink discharge port of the ink jet head to the position (y) where the line perpendicular to the surface (x) intersects with the recording medium was set to 2 mm. As a recording medium, a cardboard having a thickness of about 2 mm and having a white colored layer was used. The driving conditions of the head were standard voltage and temperature of the ink jet head, the droplet size was set to 18 pL, and 100% solid printing was performed to obtain a print.

The ink density (OD value) of the print was measured using an X-Rite (Spectral densitometer/Color meter manufactured by X-Rite Co., Ltd.) to evaluate the ink density on the recording medium.

A: OD value 1.7 or more
B: OD value 1.5 or more and less than 1.7
C: OD value 1.3 or more and less than 1.5
D: OD value less than 1.3

[Evaluation of Scratch Resistance]

An ink jet head KJ4B-YH manufactured by Kyocera Corporation was filled with each of the aqueous inks obtained in examples and comparative examples, and a supply pressure was adjusted by setting a water head difference of an ink sub-tank from a head nozzle plate surface to be +35 cm and a negative pressure of −5.0 kPa. In addition, the distance (gap) from the surface (x) having the ink discharge port of the ink jet head to the position (y) where the line perpendicular to the surface (x) intersects with the recording medium was set to 2 mm. As a recording medium, a cardboard having a thickness of about 2 mm and having a white colored layer was used. The driving conditions of the head were standard voltage and temperature of the ink jet head, the droplet size was set to 18 pL, and 100% solid printing was performed to obtain a print.

Next, "BEMCOT AP-2" manufactured by Ozu Corporation. was fixed to the head portion of "Rubbing Tester" manufactured by Taihei Rikagaku Kogyo, and 100 μL of ion exchange water was added, and a printed surface of the print was rubbed 10 times with a load of 500 g.

Next, the rubbed surface of the print was read by a scanner, and the ratio (color remaining rate) having the same color as the non-rubbed surface to the rubbed surface was analyzed with image analysis software "Image J".

A: Color retention of print is 70% or more
B: Color retention of print is 60% or more and less than 70%
C: Color retention of print is 50% or more and less than 60%
D: Color retention of print is less than 50%

The viscosity of the ink was measured under the following conditions using a conical flat plate (cone and plate) rotational viscometer corresponding to an E-type viscometer.

Measurement apparatus: TV 25 type viscometer (manufactured by TOKI SANGYO CO., LTD., TVE-25 L)
Standard solution for calibration: JS20
Measurement temperature: 32° C.
Rotation speed: 10 to 100 rpm
Injection amount: 1,200 μL The surface tension of the ink was measured under the following conditions using an automatic surface tension meter to which a Willhermi method is applied.

Measurement apparatus: Automatic surface tension meter (manufactured by Kyowa Interface Science, Inc, CBVP-Z type)
Measurement temperature: 25° C.
Probe: Platinum plate

TABLE 10

| | | Example 1 | | | Example 2 | | | Example 3 | | | Example 4 | | |
|---|---|---|---|---|---|---|---|---|---|---|---|---|---|
| | Ink | J1 | | | J2 | | | J3 | | | J4 | | |
| Physical properties of ink | Viscosity [mPa · s] | 6.3 | | | 6.2 | | | 5.1 | | | 5.2 | | |
| | Surface tension [mN/m] | 30 | | | 31 | | | 30 | | | 31 | | |
| Print | Gap [mm] | 2 | 3 | 4 | 2 | 3 | 4 | 2 | 3 | 4 | 2 | 3 | 4 |
| | Streaks | A | B | B | A | B | B | A | B | B | A | B | B |
| | Wetting and spreading | A | | | B | | | B | | | B | | |

TABLE 10-continued

|  |  | Example 1 | Example 2 | Example 3 | Example 4 |
|---|---|---|---|---|---|
|  | Ink concentration | A | A | A | A |
|  | Scratch resistance | A | A | B | B |

TABLE 11

|  |  | Example 5 |  |  | Example 6 |  |  | Example 7 |  |  | Example 8 |  |  |
|---|---|---|---|---|---|---|---|---|---|---|---|---|---|
|  | Ink | J5 |  |  | J6 |  |  | J7 |  |  | J8 |  |  |
| Physical properties of ink | Viscosity [mPa · s] | 5.2 |  |  | 5.1 |  |  | 5.3 |  |  | 5.4 |  |  |
|  | Surface tension [mN/m] | 29 |  |  | 30 |  |  | 30 |  |  | 29 |  |  |
| Print | Gap [mm] | 2 | 3 | 4 | 2 | 3 | 4 | 2 | 3 | 4 | 2 | 3 | 4 |
|  | Streaks | A | A | B | A | A | B | A | A | B | A | A | B |
|  | Wetting and spreading | A |  |  | A |  |  | A |  |  | A |  |  |
|  | Ink concentration | A |  |  | A |  |  | A |  |  | A |  |  |
|  | Scratch resistance | B |  |  | B |  |  | B |  |  | B |  |  |

TABLE 12

|  |  | Example 9 |  |  | Example 10 |  |  | Example 11 |  |  | Example 12 |  |  |
|---|---|---|---|---|---|---|---|---|---|---|---|---|---|
|  | Ink | J9 |  |  | J10 |  |  | J11 |  |  | J12 |  |  |
| Physical properties of ink | Viscosity [mPa · s] | 3.4 |  |  | 3 |  |  | 5 |  |  | 5 |  |  |
|  | Surface tension [mN/m] | 29 |  |  | 29 |  |  | 29 |  |  | 29.5 |  |  |
| Print | Gap [mm] | 2 | 3 | 4 | 2 | 3 | 4 | 2 | 3 | 4 | 2 | 3 | 4 |
|  | Streaks | A | A | B | A | A | B | B | B | C | B | B | C |
|  | Wetting and spreading | A |  |  | A |  |  | A |  |  | A |  |  |
|  | Ink concentration | A |  |  | C |  |  | A |  |  | A |  |  |
|  | Scratch resistance | C |  |  | A |  |  | B |  |  | B |  |  |

TABLE 13

|  |  | Example 13 |  |  | Example 14 |  |  | Example 15 |  |  |
|---|---|---|---|---|---|---|---|---|---|---|
|  | Ink | J13 |  |  | J14 |  |  | J15 |  |  |
| Physical properties of ink | Viscosity [mPa · s] | 5 |  |  | 5 |  |  | 5 |  |  |
|  | Surface tension [mN/m] | 29.5 |  |  | 29 |  |  | 30.5 |  |  |
| Print | Gap [mm] | 2 | 3 | 4 | 2 | 3 | 4 | 2 | 3 | 4 |
|  | Streaks | B | B | C | B | B | C | B | B | C |
|  | Wetting and spreading | A |  |  | A |  |  | A |  |  |
|  | Ink concentration | A |  |  | A |  |  | A |  |  |
|  | Scratch resistance | B |  |  | B |  |  | B |  |  |

TABLE 14

|  |  | Comparative Example 1 |  |  | Comparative Example 2 |  |  |
|---|---|---|---|---|---|---|---|
|  | Ink | H1 |  |  | H2 |  |  |
| Physical properties of ink | Viscosity [mPa · s] | 5 |  |  | 9 |  |  |
|  | Surface tension [mN/m] | 44 |  |  | 29 |  |  |
| Print | Gap [mm] | 2 | 3 | 4 | 2 | 3 | 4 |
|  | Streaks | D | D | D | C | D | D |
|  | Wetting and spreading | D |  |  | D |  |  |
|  | Ink concentration | A |  |  | A |  |  |
|  | Scratch resistance | D |  |  | C |  |  |

As a result, it was found that in the aqueous inks of Examples 1 to 15, the wetting and spreading on the recording medium were large, and streaks did not easily occur on the print even in a gap of 2 mm or more. Further, it was found that the aqueous inks of Examples 1 to 15 were excellent in the ink density and the scratch resistance.

On the other hand, in the aqueous inks of Comparative Examples 1 and 2, since the viscosity or surface tension of the ink was beyond the range described in Claim 1, the wetting and spreading on the recording medium is small, and as a result, the streaks occurred on the print, and thereby it was not possible to obtain the excellent results.

REFERENCE SIGNS LIST

1: T-shaped micro mixer M1
2: T-shaped micro mixer M2
3: T-shaped micro mixer M3
4: Tube reactor R1
5: Tube reactor R2
6: Tube reactor P3
7: Tube reactor P1 for precooling
8: Tube reactor P2 for preceding
9: Tube reactor P3 for preceding
10: Tube reactor P4 for precooling

The invention claimed is:

1. An aqueous ink for use in an ink jet recording method, in which a distance from a surface (x) having an ink discharge port of an ink jet head to a position (y) where a line perpendicular to the surface (x) intersects with a recording medium is 2 mm or more,
the ink having a viscosity in a range of 2 mPa·s or more and less than 9 mPa·s and a surface tension in a range of 20 mN/m to 40 mN/m,
wherein the aqueous ink comprises:
a binder resin (A) which is a copolymer made from monomers comprising an aromatic vinyl compound and an acrylic monomer having an amide group,
a compound (B) having a urea bond,
an aqueous medium (C), and
a colorant (D),
wherein a content of the binder resin (A) is in a range of 2% by mass to 6% by mass with respect to the total amount of the ink.

2. The aqueous ink according to claim 1,
wherein the recording medium has a water absorption of 10 g/m$^2$ or less for a contact time of 100 ms between a recording surface of the recording medium and water.

3. The aqueous ink according to claim 1,
wherein the recording medium is a cardboard or a cardboard having a layer with a water absorption of 10 g/m$^2$ or less.

4. The aqueous ink according to claim 3,
wherein the layer with a water absorption of 10 g/m$^2$ or less is white.

5. The aqueous ink according to claim 1, which further comprises a surfactant (E), wherein a content of the surfactant (E) is in a range of 0.9% by mass to 1.5% by mass with respect to a total amount of the ink.

6. The aqueous ink according to claim 1, which further comprises an organic solvent (F), wherein the organic solvent (F) includes a water soluble organic solvent (f1) which has a boiling point of 100° C. to 200° C. and has a vapor pressure of 0.5 hPa or more at 20° C., a propylene glycol (f2), and one or more organic solvents (f3) selected from the group consisting of glycerin, a glycerin derivative, diglycerin, and a diglycerin derivative.

7. The aqueous ink according to claim 6,
wherein the water soluble organic solvent (f1) includes one or more selected from the group consisting of 3-methoxy-1-butanol and 3-methyl-3-methoxy-1-butanol.

8. An aqueous ink set comprising two or more inks,
wherein at least one of the inks is the ink according to claim 1.

9. The aqueous ink according to claim 1, wherein the copolymer is made from monomers comprising styrene and acrylamide.

* * * * *